(12) United States Patent
Pradas et al.

(10) Patent No.: US 9,609,531 B2
(45) Date of Patent: Mar. 28, 2017

(54) MOBILE TERMINAL, BASE STATION AND METHODS THEREIN

(71) Applicant: Telefonaktiebolaget L M Ericsson (publ), Stockholm (SE)

(72) Inventors: Jose Luis Pradas, Stockholm (SE); Gertie Alsenmyr, Vallentuna (SE); Francisco Manzano, Stockholm (SE); Janne Peisa, Espoo (FI); Kai-Erik Sunell, Bromma (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/800,077

(22) Filed: Jul. 15, 2015

(65) Prior Publication Data

US 2015/0319783 A1 Nov. 5, 2015

Related U.S. Application Data

(63) Continuation of application No. 13/318,030, filed as application No. PCT/SE2011/051158 on Sep. 28, 2011, now Pat. No. 9,125,176.

(Continued)

(51) Int. Cl.
*H04W 74/08* (2009.01)
*H04W 24/02* (2009.01)

(Continued)

(52) U.S. Cl.
CPC ............ *H04W 24/02* (2013.01); *H04L 12/18* (2013.01); *H04W 74/006* (2013.01); *H04W 74/08* (2013.01)

(58) Field of Classification Search
None
See application file for complete search history.

(56) References Cited

U.S. PATENT DOCUMENTS

| 2009/0225709 A1 | 9/2009 | Wager et al. |
| 2010/0182974 A1 | 7/2010 | Barraclough et al. |

(Continued)

FOREIGN PATENT DOCUMENTS

| EP | 2086263 A1 | 5/2009 |
| RU | 2352067 C1 | 4/2009 |

(Continued)

OTHER PUBLICATIONS

3rd Generation Partnership Project, "Technical Specification Group Radio Access Network; Radio Resource Control (RRC); Protocol specification (Release 10)", 3GPP TS 25.331 V10.0.0, Jun. 1, 2010, pp. 1-1792, Sophia Antipolis Cedex, FR.

(Continued)

*Primary Examiner* — Huy D Vu
*Assistant Examiner* — Teisha D Hall
(74) *Attorney, Agent, or Firm* — Coats and Bennett, PLLC

(57) ABSTRACT

Embodiments herein relate to a method in a mobile terminal for requesting access to a wireless communication system. The mobile terminal receives broadcasted system information directly indicating first access request preambles for a first contention based channel, and indirectly indicating second access request preambles for a second contention based channel based on the directly indicated first access request preambles. The mobile terminal further derives the second access request preambles from the first access request preambles. Additionally, the mobile terminal requests access using the second access request preambles or the first access request preambles to access the wireless communication system.

16 Claims, 6 Drawing Sheets

Related U.S. Application Data

(60) Provisional application No. 61/388,914, filed on Oct. 1, 2010.

(51) Int. Cl.
*H04W 74/00* (2009.01)
*H04L 12/18* (2006.01)

(56) References Cited

U.S. PATENT DOCUMENTS

| | | | |
|---|---|---|---|
| 2010/0309856 A1* | 12/2010 | Baker | H04W 74/002 370/329 |
| 2012/0155420 A1 | 6/2012 | Sambhwani et al. | |
| 2013/0201952 A1 | 8/2013 | Grant et al. | |
| 2014/0023024 A1 | 1/2014 | Aminaka et al. | |

FOREIGN PATENT DOCUMENTS

| | | |
|---|---|---|
| WO | 2007052971 A1 | 5/2007 |
| WO | 2009057032 A2 | 5/2009 |

OTHER PUBLICATIONS

3rd Generation Partnership Project, "Technical Specification Group Radio Access Network; Medium Access Control (MAC) protocol specification (Release 8)", 3GPP TS 25.321 V8.4.0, Dec. 2008, pp. 1-174, Sophia Antipolis Valbonne, FR.

* cited by examiner

MOBILE TERMINAL, BASE STATION AND METHODS THEREIN

RELATED APPLICATIONS

This application is a continuation of U.S. application Ser. No. 13/318,030, filed 1 Feb. 2012, which was the National Stage of International Application No. PCT/SE2011/051158, filed 28 Sep. 2011, which claims the benefit of U.S. Provisional Application No. 61/388,914, filed 1 Oct. 2010, the disclosures of each of which are incorporated herein by reference in their entirety.

TECHNICAL FIELD

Embodiments herein relate to a mobile terminal, a base station and methods therein. In particular, embodiments herein relate to manage access to a first contention based channel and a second contention based channel.

BACKGROUND

In today's wireless communication systems a number of different technologies are used, such as Long Term Evolution (LTE), LTE-Advanced, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations. A wireless communication system comprises base stations providing radio coverage over at least one respective geographical area forming a cell. The cell definition may also incorporate frequency bands used for transmissions, which means that two different cells may cover the same geographical area but using different frequency bands. Mobile terminals are served in the cells by the respective base station and are communicating with respective base station. The mobile terminals transmit data over an air or radio interface to the base stations in uplink (UL) transmissions and the base stations transmit data over an air or radio interface to the mobile terminals in downlink (DL) transmissions.

Release 6 of the third generation partnership project (3GPP) standards introduced Enhanced Uplink (E-UL), also known as High Speed Uplink Packet Access (HSUPA). Compared to previous releases E-UL improved performance of uplink communications—those from a mobile terminal, i.e., User Equipment, UE, to a base station—using higher data rates, reduced latency, and improved system capacity. These enhancements were implemented through a new transport channel called the Enhanced Dedicated Channel (E-DCH). In Release 6, and continuing into Release 7, however, a mobile terminal may only use the E-DCH in limited circumstances.

Specifically, at the Radio Resource Control (RRC) level, a mobile terminal may be in two basic operation modes, called IDLE mode and CONNECTED mode. In IDLE mode, the mobile terminal requests an RRC connection before sending any uplink data or responding to a page. In CONNECTED mode, by contrast the mobile terminal has an RRC connection, and may be in one of several service states: Universal Mobile Telecommunications System (UMTS) Radio Access Paging Channel (URA_PCH) state, a Cell Paging Channel (CELL_PCH) state, a Cell Forward Access Channel (CELL_FACH) state, and Cell Dedicated Channel (CELL_DCH) state. The URA_PCH and CELL_PCH states are paging states in which the mobile terminal sleeps and only occasionally wakes up to check for a page. To send uplink data, the mobile terminal must be moved to the CELL_FACH or CELL_DCH state. When moved to the CELL_FACH state in Releases 6 and 7, the mobile terminal may send a relatively small amount of uplink data over a contention-based transport channel called the Random Access Channel (RACH), but not over the E-DCH; to send data over the E-DCH, the mobile terminal had to be moved to the CELL_DCH state, which introduces a delay.

To reduce the delay caused by the state transition, Release 8 of the 3GPP standards allocates a portion of E-DCH resources as common resources, also called common E-DCH resources, that may be used on a contention-basis by mobile terminals in the CELL_FACH state. Accordingly, mobile terminals in the CELL_FACH state with a relatively large amount of uplink data may send that data over the E-DCH using the common E-DCH resources rather than having to make multiple accesses over the RACH or switch to the CELL_DCH state.

This however comes at a cost of increased downlink control signaling. Indeed, the base station now broadcasts system information to mobile terminals that informs them about which access request preambles may be used for requesting E-DCH access, and which E-DCH resources are available as common E-DCH resources. Among other disadvantages, this increased DL control signaling may delay the base station's signaling of more crucial system information.

For example, a base station often broadcasts system information in a series of so-called System Information Blocks (SIBs). Different types of system information are broadcasted in different types of SIBs, one after another in a time division manner. This process is repeated to continually provide system information to mobile terminals on an as-needed basis. Accordingly, any given large SIB delays broadcast of the entire series of SIBs, which in turn increases the time between which any given SIB is repeated, i.e., the SIB's repetition factor. If the SIB's repetition factor is excessively large for an SIB with crucial system information, there may be long periods of time in which a mobile terminal cannot be paged, send uplink data, perform a cell update, or perform a fallback to a circuit-switched network, also called CS fallback. This type of delays may be caused by the DL control signaling associated with Release 8 of the 3GPP standards resulting in a reduced performance of the wireless communication system.

SUMMARY

An object of embodiments herein is to enhance the performance of the wireless communication system.

According to some embodiments, the object is achieved by a method in a base station for managing access to a first contention based channel and a second contention based channel. The base station encodes system information directly indicating first access request preambles for the first contention based channel, and indirectly indicating second access request preambles for the second contention based channel based on the directly indicated first access request preambles. The base station further broadcasts the encoded system information to mobile terminals.

According to some embodiments, the object is yet achieved by a base station for managing access to the first contention based channel and the second contention based channel. The base station comprises a processing circuit configured to encode system information directly indicating first access request preambles for the first contention based channel, and indirectly indicating second access request preambles for the second contention based channel based on the directly indicated first access request preambles. The base station further comprises a transmitter circuit configured to broadcast the encoded system information to mobile terminals.

According to some embodiments, the object is achieved by a method in a mobile terminal for requesting access to the wireless communication system. The mobile terminal receives broadcasted system information directly indicating first access request preambles for the first contention based channel, and indirectly indicating second access request preambles for the second contention based channel based on the directly indicated first access request preambles. The mobile terminal further derives the second access request preambles from the first access request preambles. Additionally, the mobile terminal requests access using the second access request preambles or the first access request preambles to access the wireless communication system.

According to some embodiments, the object is additionally achieved by a mobile terminal for requesting access to a wireless communication system. The mobile terminal comprises a receiver circuit configured to receive broadcasted system information directly indicating first access request preambles for the first contention based channel, and indirectly indicating second access request preambles for the second contention based channel based on the directly indicated first access request preambles. The mobile terminal further comprises a processing circuit configured to derive the second access request preambles from the first access request preambles. The processing circuit is further configured to request access using the second access request preambles or the first access request preambles to access the wireless communication system.

By indicating the second access request preambles based on e.g. as a function of the directly indicated first access request preambles, the amount of data signaled in the system information is reduced. Thus, the delay for transmitting system information is reduced and the performance of the wireless communication system is improved.

BRIEF DESCRIPTION OF THE DRAWINGS

Embodiments will now be described in more detail in relation to the enclosed drawings, in which.

DETAILED DESCRIPTION

Figure 1:
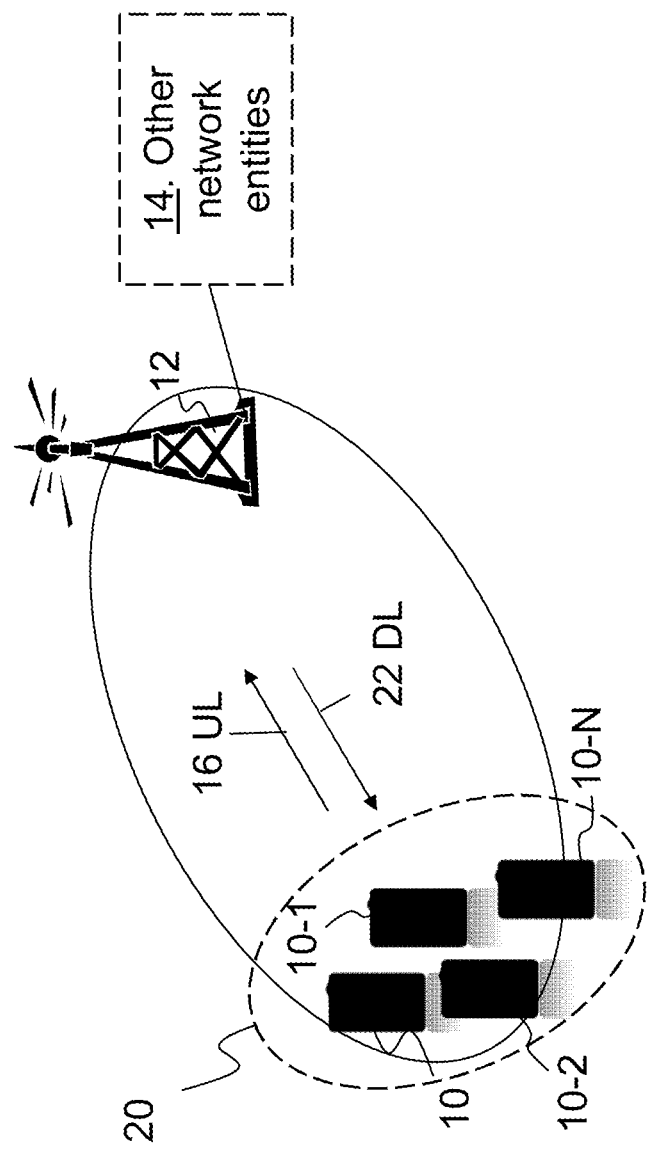
FIG. 1 is a schematic block diagram depicting a wireless communication system.

FIG. 1 is a schematic overview depicting a wireless communication system, also referred to as a radio communications network. In today's wireless communication systems a number of different technologies are used, such as LTE, LTE-Advanced, WCDMA, GSM/EDGE, WiMax, or UMB, just to mention a few possible implementations. The wireless communication system, which includes a base station 12 and one or more other entities 14. The base station 12 provides an uplink communications channel 16 for receiving uplink data from individual mobile terminals 10, 10-1, 10-2 . . . 10-N in a group 20 of N mobile terminals, also conveniently referred to as "users" or "user equipments". The base station 12 further provides a downlink communications channel 22 for sending transmissions to mobile terminals 10-10-N in the group 20, including control signaling.

It should be understood by the skilled in the art that "mobile terminal" is a non-limiting term which means any user equipment, wireless terminal, device or node e.g. Personal Digital Assistant (PDA), laptop, mobile, sensor, relay, mobile tablets or even a small base station communicating within a cell served by the base station 12.

The base station 12 may also be referred to as e.g. a NodeB, an evolved Node B (eNB, eNode B), a radio base station, a base transceiver station, Access Point Base Station, base station router, a base station controller, a radio network controller, or any other network unit capable to communicate with the mobile terminal 10 within the cell served by the base station 12 depending e.g. of the radio access technology and terminology used.

The base station 12 supports two different Contention-Based (CB) channels of the uplink communications channel 16, one legacy CB channel, e.g., offering low data rates such as a RACH, and one non-legacy CB channel, e.g., offering high data rates such as a E-DCH. Some mobile terminals 10-1-10-N, referred to as legacy mobile terminals, only support the legacy CB channel, while others support both CB channels. If the mobile terminal 10 supports both channels, the mobile terminal 10 may preferentially select the non-legacy CB channel for sending uplink data. In order to manage access to both CB channels, the base station 12 broadcasts system information for both CB channels on a control channel of the downlink communications channel 22. Contention based channel means herein a channel that many mobile terminals may use without pre-coordination. Thus, for a contention based channel the base station 12 broadcasts access request preambles that the mobile terminal 10 randomly selects. In a non-contention based channel the base station 12 first maps an access request preamble to the mobile terminal 10 and then transmits the mapped access request preamble to the mobile terminal 10 for the mobile terminal 10 to use. In particular, the base station 12 broadcasts over the control channel system information that indicates which first access request preambles and second access request preambles may be used for requesting access using respective ones of the CB channels. Each access request preamble may be mapped to a particular resource of a CB channel. In this regard, the CB channels share the access request preamble "space." The base station 12 may also broadcast system information that indicates which resources of the CB channels are available.

As a point of advantage, the base station 12 intelligently broadcasts system information for the CB channels, in order to limit the amount of downlink control signaling. According to embodiments herein, instead of broadcasting system information to mobile terminals 10-10-N that independently indicates access request preambles for respective ones of the CB channels, the base station 12 broadcasts system information indirectly indicating the access request preambles for one channel, e.g., the non-legacy CB channel, based on, e.g. as a function of the access request preambles for the other channel, e.g., the legacy CB channel. Correspondingly, the mobile terminal 10 receives system information directly indicating the access request preambles for one channel, e.g., the legacy CB channel, and derives the access request preambles for the other channel, e.g., the non-legacy CB channel, as a function of the directly indicated access request preambles. In some embodiments, the mobile terminal 10 then randomly selects one of the derived access request preambles and transmits the selected access request preamble to the base station 12, in order to request access to the associated CB channel, that is, the non-legacy channel or the legacy channel. It should be understood that the system information may directly indicate the access request preambles of the non-legacy channel and indirectly indicate the request preambles of the legacy channel.

Embodiments described herein may advantageously reduce the signaling required in System information Blocks (SIB) to broadcast the total amount of common E-DCH resources around 70% compared with the current signaling. In particular, after Release 8 (Rel-8), SIB type 5 (SIB5), which is the SIB type that indicates the preambles may be substantially enlarged due to the common E-DCH configurations. A total of 32 common E-DCH resources may be configured in a cell. If all these resources are included in SIB5, the size of SIB5 would be increased by 8 segments, where a segment comprises a header and a data field, e.g. the data field carries the encoded system information elements. This would mean that SIB5 may take more than 12 segments, and would in turn mean that a Master Information Block takes up to 16 segments, SIB type 11 (SIB11) takes up to 16 segments, and SIB5 would take more than 50% of the 64 segments available in a 1.280 second scheduling window frame. As a consequence, SIB5 will not be able to be broadcasted in less than 640 ms, meaning that the repetition factor may need to be augmented. However, according to embodiments herein, the number of segments to broadcast SIB5 may be reduced to less than 3 segments. This means that the repetition factor of the SIB5 may be reduced. Hence, the delay to transmit the URA/CELL updates Radio Bearer (RB) reconfiguration when it applies, or the delay introduced in the CS fall back mechanism will be minimized. In more detail, SIBs are read by the mobile terminal 10 in different stages. For example, when the mobile terminal 10 is switched on, or when the mobile terminal 10 moves from CELL_DCH state to CELL_FACH state, the mobile terminal 10 needs to acquire the SIBs again. Similarly, when the mobile terminal 10 moves to another cell, the new SIBs have to be read.

Cell update will be the most impacted procedure. Cell update is done when moving from CELL_DCH state to CELL_FACH state if the IDs are not included or the mobile terminal 10 selects a different cell than the one indicated in the RB reconfiguration. Cell Update is also performed when the mobile terminal 10 changes the cell. For E-DCH in mobile terminals in CELL_FACH state and CELL_DCH state, the Cell Update is also required after a Radio Link (RL) failure. There are other cases in which a cell update is required.

Furthermore, in Release-10 of the 3GPP standards, also known as $4^{th}$ Generation, CS fallback from LTE was introduced. This feature may require the mobile terminal 10 to read the SIBs before starting the procedure.

Those skilled in the art will appreciate that while the above examples have been described in the context of 3GPP standards, these teachings are applicable to a wide range of system types, communication channelization schemes, etc.

Figure 2:
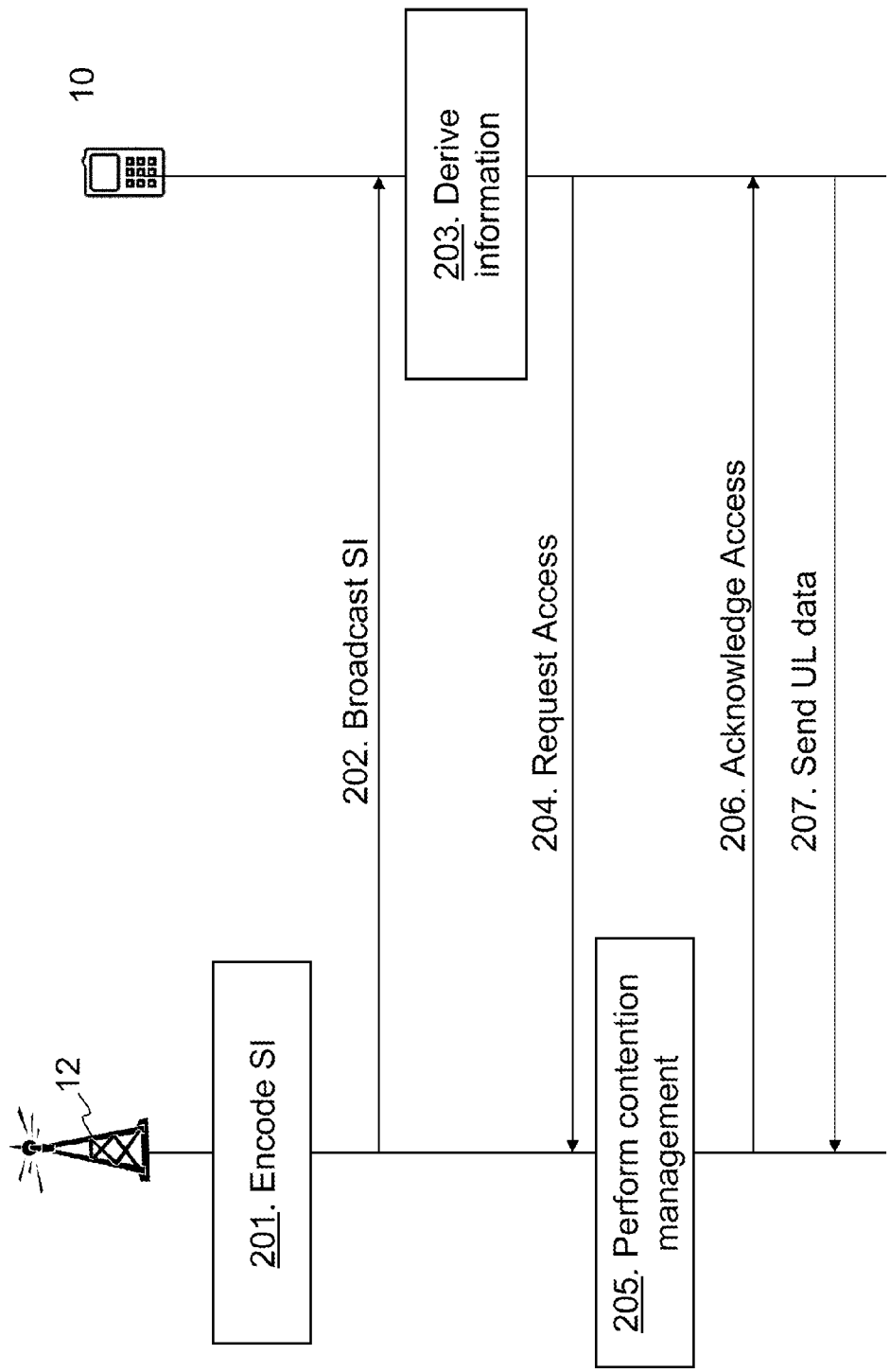
FIG. 2 is a combined flowchart and signaling scheme depicting embodiments herein.

FIG. 2 is a schematic combined flowchart and signaling scheme depicting some embodiments herein.

Step 201. The base station 12 encodes the system information to be broadcasted to mobile terminals within an area covered by the base station 12. The system information is encoded so that first access request preambles for the first contention based channel are directly indicated. The second access request preambles for the second contention based channel is indirectly indicated by being indicated based on the indicated first access request preambles. Indirectly herein means that the second access request preambles are derivable from the first access request preambles, e.g. as a function of the indicated first access request preambles. For example, access request preambles of a common E-DCH are indicated as an inverse of access request preambles, e.g. logical negotiation of each bit, of a Physical Random Access Channel (PRACH) or indicated as being not the access request preambles of PRACH. The encoding may comprise physical layer encoding.

Step 202. The encoded system information is broadcasted to the mobile terminal 10.

Step 203. The mobile terminal 10 that has received the broadcasted system information that directly indicates the first access request preambles for the first contention based channel, derives the second access request preambles for the second contention based channel as a function of the directly indicated first access request preambles.

As a specific example in the context of 3GPP specifications, the base station 12 may support CB channels that correspond to the Random Access Channel (RACH) and the common Enhanced Dedicated Channel (E DCH). Accordingly, the base station 12 broadcasts system information for these channels in a System Information Block (SIB), namely SIB Type 5. System information for the RACH is broadcast in SIB5 using the Information Element (IE) "PRACH System Information List," while system information for the common E-DCH is broadcast in SIB5 using the IE "Common E-DCH System Information." An access request preamble to be used corresponds to a PRACH preamble, which is characterized by a signature sequence, also referred to as signature, a scrambling code, and a sub-channel.

In some embodiments, the base station 12 may in step 202 also reduce downlink control signaling by broadcasting system information that intelligently indicates available resources of a CB channel. In particular, processing circuits of the base station 12 may encode in step 203 system information that indicates available resources of a CB channel relative to other available resources of that channel, e.g., relative to the position in which other available resources are indicated in the system information, rather than indicating each resource independently. In some embodiments, for example, the available resources are indicated in an ordered list, and the base station 12 indicates available resources as a function of their position in the list relative to other resources. The TX circuits of the base station 12 broadcasts this system information in a manner similar to that described above with respect to the information about the access request preambles.

Correspondingly, the RX circuits of the mobile terminal 10 in various embodiments are configured to receive system information that indicates a first available resource of a CB channel. The processing circuits of the mobile terminal 10 are configured to then derive information for a second available resource of the CB channel based on e.g. as a function of the first available resource. This may entail, for instance, deriving information for the second available resource according to a pre-determined rule that defines the second resource as a function of the first resource, e.g., as a function of the first resource's position within an ordered list describing the resources. In various embodiments, the second available resource of the CB channel is mapped to an access request preamble randomly selected by the mobile terminal. In such embodiments, the processing circuits are configured to derive information for the second available resource responsive to receiving a positive acknowledgement corresponding to the selected preamble, and to then transmit uplink data on the CB channel using the second available resource. It should be noted that the same applies for a third resource, a fourth resource and so on.

Step 204. At some point after receiving this system information, the mobile terminal 10 requests access to a supported, or preferred, one of the CB channels, the first or the second contention based channel, by randomly selecting one of the first or second access request preambles associated with that channel, and by transmitting the selected preamble to the base station 12.

Step 205. The base station 12 that has received the transmitted access request preamble, performs contention management for the associated CB channel.

Step 206. The base station 12 transmits or signals on the downlink communications channel 22 whether or not the base station 12 acknowledges or denies the mobile terminal's request for access to that channel.

Step 207. If the mobile terminal 10 receives a positive acknowledgement, the mobile terminal 10 proceeds by sending uplink data on whichever available resource of the associated CB channel is mapped to the selected and acknowledged access request preamble.

Figure 3:
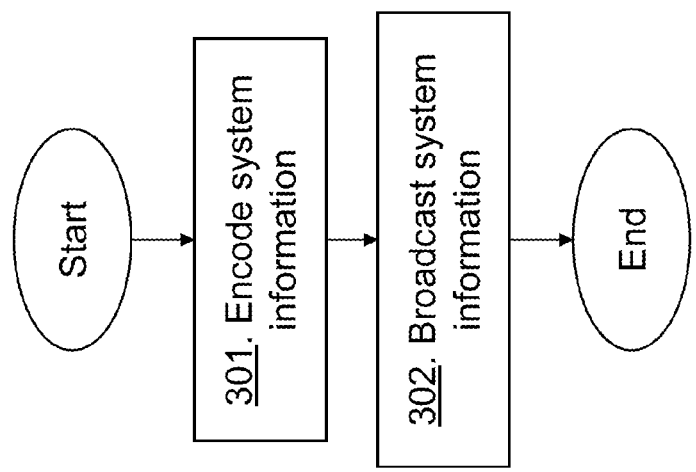
FIG. 3 is a schematic flowchart depicting embodiments of a method in a base station.

FIG. 3 is a schematic flowchart depicting embodiments of a method in the base station 12 for managing access to the first contention based channel and the second contention based channel.

Step 301. The base station 12 encodes system information directly indicating first access request preambles for the first contention based channel, and indirectly indicating second access request preambles for the second contention based channel based on the directly indicated first access request preambles. In some embodiments the second access request preambles are derivable as a function of the first access request preambles.

With the examples, variations, and modifications described above, those skilled in the art will also appreciate that the base station 12 herein is generally configured to perform the method illustrated in FIG. 3. In FIG. 3, processing at the base station 12 includes encoding system information that directly indicates access request preambles for one contention-based uplink channel and that indirectly indicates access request preambles for another contention-based uplink channel based on e.g. as a function of the directly indicated preambles. In some embodiments the first contention based channel corresponds to a random access channel, RACH. In some embodiments the second contention based channel corresponds to a common Enhanced Dedicated Channel, E-DCH. In some embodiments the encoded system information is comprised in a System Information Block type 5, SIB5.

In more detail, embodiments herein reduce the number of segments used in SIB5 to broadcast the IE "Common E-DCH System Info" which defines the common E-DCH resource parameters. For this purpose, a new coding is proposed for the IEs included in the IE "Common E-DCH System Info" within SIB5. The IE "Common E-DCH System Info" is an optional IE included in SIB5. The table below presents the current encoding for FDD for the IE "Common E-DCH System Info" as captured in 3GPP Technical Specification (TS) 25.331 section 10 version 10.0.0.

| Information Element/Group name | Need | Multi | Type and reference | Semantics description | Version |
| --- | --- | --- | --- | --- | --- |
| UL interference for common E-DCH | OP | | UL interference 10.3.6.87 | | REL-8 |
| Common E-DCH MAC-d flows | MP | | Common E-DCH MAC-d flows 10.3.5.3b | | REL-8 |
| CHOICE mode | MP | | | | REL-8 |
| >FDD | | | | | REL-8 |
| >>PRACH preamble control parameters (for Enhanced Uplink) | MP | | PRACH preamble control parameters (for Enhanced Uplink) 10.3.6.54a | Control parameters of the physical signal. | REL-8 |
| >>Initial Serving grant value | MP | | Integer (0 . . . 37) | (0 . . . 37) indicates E-DCH serving grant index as defined in [15]. | REL-8 |
| >>E-DCH Transmission Time Interval | MP | | Integer(2, 10) | Unit is ms. | REL-8 |
| >>E-AGCH Info | MP | | E-AGCH Info 10.3.6.100 | | REL-8 |
| >>HARQ info for E-DCH | MP | | HARQ info for E-DCH 10.3.5.7d | | REL-8 |
| >>Uplink DPCH power control info | MP | | Uplink DPCH power control info for Common E-DCH 10.3.6.91a | | REL-8 |

| Information Element/Group name | Need | Multi | Type and reference | Semantics description | Version |
| --- | --- | --- | --- | --- | --- |
| >>E-DPCCH info | MP | | E-DPCCH Info 10.3.6.98 | | REL-8 |
| >>E-DPDCH info | MP | | E-DPDCH info 10.3.6.99 | | REL-8 |
| >>F-DPCH TPC command error rate target | MP | | Real (0.01 . . . 0.1 by step of 0.01). | Downlink F-DPCH information. The actual value of dl-FDPCH-TPCcommandErrorRate = IE value * 0.01 | REL-8 |
| >>Additional E-DCH transmission back off | MP | | Integer (0 . . . 15) | In terms of TTIs. | REL-8 |
| >>Maximum E-DCH resource allocation for CCCH | MP | | Enumerated (8, 12, 16, 24, 32, 40, 80, 120) | In terms of TTIs. | REL-8 |
| >>Maximum period for collision resolution phase | MP | | Integer (8 . . . 24) | In terms of TTIs. | REL-8 |
| >>E-DCH transmission continuation back off | MP | | Enumerated (0, 8, 16, 24, 40, 80, 120, infinity) | In terms of TTIs. If set to "infinity", implicit common E-DCH resource release is disabled. | REL-8 |
| >>ACK/NACK support on HS-DPCCH | MP | | Boolean | TRUE indicates that HS-DPCCH shall be used when a common E-DCH resource is allocated to the UE for DTCH/DCCH transmission after collision resolution. FALSE indicates that HS-DPCCH shall not be used | REL-8 |
| >>Measurement Feedback Info | OP | | Measurement Feedback Info 10.3.6.40a | | REL-8 |
| >>Common E-DCH Resource Configuration information list | MP | 1 to <maxEDCHs> | | | REL-8 |
| >>>Soffset | MP | | Integer(0 . . . 9) | (0 . . . 9) indicates symbol offset as defined in [26] | REL-8 |
| >>>F-DPCH Code number | MP | | Integer (0 . . . 255) | | REL-8 |
| >>>E-RGCH Information | OP | | E-RGCH Info 10.3.6.102 | | REL-8 |
| >>>E-HICH info | MP | | E-HICH info 10.3.6.101 | | REL-8 |
| >>>Uplink DPCH code info | MP | | Uplink DPCH code info for Common E-DCH 10.3.6.87b | | REL-8 |

MP means Mandatory Present and OP stands for Optional. An IE which is Mandatory Present always needs to be included and have a value while the value of an optional IE may be or not be present. MD stands for Mandatory Default. When an IE is set as Mandatory Default, a value for that IE is always needed, and a particular default value is mentioned.

Embodiments herein propose modifications to some of these IEs, as described in detailed below.

In some embodiments the first access request preambles correspond to Physical Random Access Channel, PRACH, preambles characterised by a signature sequence, a scrambling code, and a sub-channel. Thus, the first access request preambles may correspond to PRACH preambles for RACH and the second access request preambles may correspond to PRACH preambles for E-UL or E-DCH preambles.

Modified IEs are:

>>PRACH Preamble Control Parameters for Enhanced Uplink

The PRACH preamble control parameters for E-UL IE may comprise available signatures, preamble scrambling code numbers, and Available Sub-Channel Numbers.

Available Signatures

This is a bit string IE and each bit indicates whether a signature is used or not used. The signatures configured for RACH and included in the IE "Available Signatures" present in the IE "PRACH info (for RACH) ". These signatures cannot be used for Enhanced Uplink in CELL_FACH and Idle Mode. The IE "PRACH info (for RACH)" is included in the IE "PRACH System Information list" which is carried in SIB5. "PRACH System Information list", "PRACH info (for RACH)" and "Available Signatures" are mandatory present IE. Hence, they will always be included in SIB5. Thus, in some embodiments the first access request preambles are indicated in an information element denoted as Physical Random Access Channel, PRACH, info comprised in a PRACH system information list carried in System Information Block type 5, SIB5.

The IE "Available Signatures" comprised in the IE "PRACH preamble control parameters for Enhanced Uplink" is also a mandatory present value; however, in embodiments herein this IE is optional and takes a default value. This default value may be the same or a function of another IE, e.g., the "Available Signatures" present in the IE "PRACH info (for RACH)".

As an example, the default value in various embodiments is a "NOT" or "INVERSE" function operation of the bit string values included in "Available Signatures" present in the IE "PRACH info (for RACH)".

An illustrative example is presented to clarify the concept. If the value of the IE "Available Signatures" included in the IE "PRACH info (for RACH)" is: 1111111100000000, then the default value of the IE "Available Signatures" contained in the IE "Common E-DCH System Info" would be the inverse bit operation of (1111111100000000) which is equal to 0000000011111111.

Therefore, the IE "available signatures" is set to mandatory default (MD) and the semantics of the description would say that the default value is the inverse bit-string indicated in the IE "Available Signature" in the IE "PRACH Info (for RACH)". In other words, the available signatures for Enhanced Uplink in CELL_FACH are those signatures which are not used for RACH, unless the IE is present.

Doing so, the base station 12 suppresses including this IE in the IE "PRACH preamble control parameters for Enhanced Uplink" and thereby reduces downlink control signaling. A mobile terminal 10 that does not receive such an IE nevertheless sets the IE to a default value described above. If the IE is present, the signaled values overwrite the default value. Thus, in some embodiments the first access request preambles for the first contention based channel are indicated as available signatures in the information element PRACH info and the second access request preambles for the second contention based channel are indirectly indicated as a function of the first access request preambles in an information element denoted as available signatures in an information element denoted PRACH preamble control parameters for enhanced uplink.

Preamble Scrambling Code Number

This IE is also included in the IE "PRACH info (for RACH)". Embodiments herein teach that the scrambling code for the common E-DCH be the same as that of the RACH, at least by default. If it would be different, the new Preamble scrambling code number in various embodiments is a function of the Preamble scrambling code number present in the IE "PRACH info (for RACH)". Hence, this IE in some embodiments is MD and by default equal to the IE "Preamble scrambling code number" indicated in the IE "PRACH info (for RACH)," and is otherwise a function of the IE "Preamble scrambling code number" indicated in the IE "PRACH info (for RACH)".

As in the previous case, the base station 12 refrains from including this IE in the IE "PRACH preamble control parameters for Enhanced Uplink" and thereby reduces downlink control signaling. A mobile terminal 10 that does not receive such an IE nevertheless sets the IE to a default value described above. If the IE is present, the signaled values overwrite the default value. Thus, in some embodiments a preamble scrambling code number of the second access request preambles is a preamble scrambling code of the first access request preambles. Alternatively, the preamble scrambling code number of the second access request preambles may be a function of the preamble scrambling code of the first access request preambles.

Available Sub-Channel Number

This IE is a bit string. Each bit indicates availability for a sub-channel, where the sub-channels are numbered from "sub-channel 0" to "sub-channel 11". The value 1 of a bit indicates that the corresponding sub-channel is available and the value 0 indicates that it is not available.

This IE is also included in the IE "PRACH info (for RACH)". This IE in some embodiments is also set to MD. The mandatory default value is a function of the IE "PRACH info (for RACH)".

For example, this IE may be set equal to the IE "Available Sub-Channel Number" indicated in the IE "PRACH info (for RACH)". In another approach, the default value may be the INVERSE (or NOT) function of the IE Available Sub-Channel Number" indicated in the IE "PRACH info (for RACH)"

As in the previous case, the base station 12 refrains from including this IE in the IE "PRACH preamble control parameters for Enhanced Uplink" and thereby reduces downlink control signaling. A mobile terminal 10 that does not receive such an IE nevertheless sets the IE to a default value described above. If the IE is present, the signaled values overwrite the default. Thus, in some embodiments an available sub-channel number of the second access request preambles is set to be equal, the inverse or a 'not'-function of an available sub-channel number indicated in the information element denoted PRACH info.

In some embodiments, the base station 12 also reduces downlink control signaling by intelligently broadcasting system information that indicates available resources of a CB channel, e.g., the non-legacy CB channel.

Consider a specific example in 3GPP specifications, whereby available resources comprise a combination of a power control command channel time slot, a power control command channel coding, and the like, with each component of an available resource being indicated relative to a corresponding component of another available resource.

In some embodiments the base station 12 encodes system information that indicates a second available resource of the second contention based channel relative to a first available resource of the second contention based channel. The second available resource may in some embodiments be indicated in an ordered list of resources as a function of a position of the first available resource in the ordered list.

The ordered list may in some embodiments define common Enhanced-Dedicated Channel (E-DCH) resources. Each E-DCH Resource may be defined by a Soffset information element, a Fractional Dedicated Physical Control Channel (F-DPCH) code number information element, and an E-DCH Hybrid Automatic Repeat Request Acknowledgement Indicator Channel (E-HICH) info for common E-DCH information element.

>>Common E-DCH Resource Configuration Information List

This IE is a list which comprises all the defined common E-DCH resources. A maximum of 32 common E-DCH resources may be included in this list. For each defined common E-DCH resource, the following IEs are defined:

>>>Soffset

This IE is a MP IE which value ranges between 0 and 9. This value indicates the concrete slot within the F-DPCH in which the power control commands are included for a concrete F-DPCH code.

Instead of being MP, this IE in various embodiments is set as MD. If the IE is not present, "Soffset" takes a default value. The default value is a function of the position of the common E-DCH resource within the list, a function the "Soffset" value of a previous common E-DCH resource instance, or a function of the position of the common E-DCH resource and the "Soffset" value of a previous common E-DCH resource instance. The first defined common E-DCH resource would occupy position 0 (or 1). The second defined common E-DCH resource would occupy position 1 (or 2). Similar reasoning would apply with the other defined resources.

A concrete realization would be, for instance, if the "Soffset" value for the first instance of the common E-DCH resource takes a default value and the rest of the common E-DCH resources take a value related to the last instance.

For example, a simple formula is presented below to set default values for each defined common E-DCH resource.

Soffset=(offset+common E-DCH resource list position)mod 10 where "offset" is the value of the last instance of the IE "Soffset". If the IE "Soffset" was not present in the first instance, "offset" is equal to zero.

"common E-DCH resource list position" indicates the Common E-DCH resource Configuration Information number by order of appearance. The value of the "common E-DCH resource list position" may be zero (or one) for the first instance.

If the IE is present, the signaled value overwrites the default value.

In some embodiments the position of the second available resource in the ordered list is defined by a default value in the Soffset information element, which default value is a function of the position of the second available resource within the ordered list, a function of a "Soffset" value of a previous first available resource, or a function of the position of the second available resource and an offset value. The offset value is a Soffset value of the first available resource.

>>>F-DPCH Code Number

This IE indicates the code to be used for the F-DPCH.

Instead of being MP, this IE is optional, conditional on value.

If the coding presented for the Soffset is applied, potentially, only three instances of the F-DPCH code number are needed, once for each 10 common E-DCH resources. Hence, in the best configuration, only three instances would need to be present.

Therefore, this IE is in various embodiments set as conditional on value (CV) so that this IE is mandatory present for the first occurrence. Alternatively, it should be mandatory present for the first occurrence or if the default value is equal to zero. Otherwise, this IE is optional. In addition, if this IE is not present, the value is equal to the last occurrence of this IE.

If the IE is present, the signaled value overwrites the default value.

Thus, in some embodiments the F-DPCH code number information element may be the same for a maximum number of ten common E-DCH resources.

>>>>E-HICH Info

E-HICH info contains two additional IEs. Changes in this IE would imply impacts in Release 6 and Release 7 of the 3GPP standards. In order to avoid impacts in earlier versions, a new IE may be used instead: "E-HICH info for common E-DCH". Only two IEs would be needed as this feature only applies to FDD. In some embodiments the E-HICH info for common E-DCH information element is defined by a channelization code and a signature sequence. A default value of the signature sequence may be a function of the position of the second available resource within the ordered list, a function of a "Signature Sequence" value of a previous first available resource, or a function of the position of the second available resource and the "Signature Sequence" value of a previous first available resource.

>>>E-HICH Info for Common E-DCH

Channelization Code

This IE may be set as a conditional on value (CV) IE so that the IE is mandatory only for the first instance and optional for the rest of them. If this IE is not present, the value is equal to the last occurrence of this IE. Thus, in some embodiments the channelization code of the second available resource may be equal to a channelization code of the first available resource.

If the IE is present, the signaled value overwrites the default value.

Signature Sequence

The value of this IE is a number between 0 and 39. This IE in various embodiments is set as MD. If the IE is not present, "Signature sequence" takes a default value.

The default value is a function of the position of the common E-DCH resource within the list, a function the "Signature Sequence" value of a previous common E-DCH resource instance, or a function of the position of the common E-DCH resource and the "Signature Sequence" value of a previous common E-DCH resource instance. The first defined common E-DCH resource would occupy position 0 (or 1). The second defined common E-DCH resource would occupy position 1 (or 2). Similar reasoning would apply with the other defined resources.

A concrete realization may be, for instance, if the "Signature sequence" for the first instance of the common E-DCH resource would take a default value and the rest of the common E-DCH resources would take a value function of the last instance of the IE.

For example, a simple formula is presented below to set default values for each defined common E-DCH resource in which the IE is not present.

Signature Sequence=(offset+common E-DCH resource list position)mod 40 where "offset" is the value of the last occurrence of the IE "Signature Sequence". If "Signature Sequence" was not present in the first instance, "offset" is equal to zero.

"common E-DCH resource list position" indicates the Common E-DCH resource Configuration Information number by order of appearance. The value of the "common E-DCH resource list position" is zero (or one) for the first instance.

If the IE is present, the signaled value overwrites the default value.

>>>Uplink DPCH Code Info (for Common E-DCH)

Scrambling Code Number

Scrambling code number is a MP present value. This IE takes a relative large number of bits for each common E-DCH resource. This IE in some embodiments is changed to conditional on value (CV) instead, avoiding including such a large number of bits per configured common E-DCH resource.

Conditional on value would mean that this IE is mandatory present for the first occurrence. Otherwise, this IE is optional. In addition, if this IE is not present, the value is of the IE is a function of the last instance. For instance, it could be a function of the position of the common E-DCH resource within the list of common E-DCH resources, a function the "Uplink DPCH code info for Common E-DCH" value of a previous common E-DCH resource instance, or a function of the position of the common E-DCH resource and the "Uplink DPCH code info for Common E-DCH" value of a previous common E-DCH resource instance.

The following formula illustrates how the default values may be set if the IE is not included:

Scrambling code number=offset+common E-DCH resource list position where "offset" is the value of the last occurrence of the IE "Scrambling code number". If "offset" was not present in the first instance or occurrence, "offset" is equal to zero.

"common E-DCH resource list position" indicates the Common E-DCH resource Configuration Information number by order of appearance. The value of the "common E-DCH resource list position" is zero (or 1) for the first instance.

If the IE is present, the signaled value overwrites the default value.

Thus, in some embodiments the second available resource is defined by a value in an information element of a scrambling code of an uplink Dedicated Physical Control Channel. The value may be a function of the position of the second available resource within the ordered list of common E-DCH resources, a function of a value in an information element of a scrambling code of an uplink Dedicated Physical Control Channel of a previous first available resource or a function of the position of the second available resource and an "Uplink DPCH code info for Common E-DCH" value in the information element of a scrambling code of an uplink Dedicated Physical Control Channel of the previous first available resource.

>>E-DPDCH Info

E-DCH Minimum Set E-TFCI

This IE is mandatory default. If this IE is missing, it means that there is no minimum E-TFCI set.

In the case of E-DCH in CELL_FACH and Idle Mode, the UE shall always send its message, especially CCCH messages. Otherwise, the UE will be blocked and, potentially, the UE will be dropped. It feels obvious that for E-DCH in CELL_FACH and Idle Mode, the E-DCH minimum set E-TFCI will be always included and it necessary must be a number above zero (E-TFCI index 0 would only let the UE to send the Scheduling Information).

Therefore, the semantic description may be modified so that for CELL_FACH and Idle Mode (or for Enhanced Uplink in CELL_FACH and Idle Mode), if the IE is not included, the E-DCH minimum set E-TFCI is set to a defined value. The only restriction for this value is that the value belongs to the set of values defined in E-TFCI table. The concrete table to be used is indicated in the IE "E-TFCI table index" included also in the IE "E-DPDCH info". As mentioned before, E-TFCI value zero only lets the UE to transmit the Scheduling Information. Therefore, the minimum reasonable E-TFCI value so that the UE can transmit user or higher layers control data is the E-TFCI value 1.

If the IE is present, the signaled values overwrite the default value.

Applying the encoding suggested before, the structure of the IE "PRACH preamble control parameters for Enhanced Uplink" and other IEs involved would result in shown below. Affected IEs are underlined and non-affected IEs are defined in reference to 3GPP Technical Specification (TS) 25.331 section 10 version 10.0.0:

Common E-DCH system info IEs are illustrated in the table below

| Information Element/Group name | Need | Multi | Type and reference | Semantics description | Version |
|---|---|---|---|---|---|
| UL interference for common E-DCH | OP | | UL interference 10.3.6.87 | | REL-8 |
| Common E-DCH MAC-d flows | MP | | Common E-DCH MAC-d flows 10.3.5.3b | | REL-8 |
| CHOICE mode | MP | | | | REL-8 |
| >FDD | | | | | REL-8 |
| >>PRACH preamble control parameters (for Enhanced Uplink) | MP | | PRACH preamble control parameters (for Enhanced Uplink) 10.3.6.54a | Control parameters of the physical signal. | REL-8 |
| >>Initial Serving grant value | MP | | Integer (0 . . . 37) | (0 . . . 37) indicates E-DCH serving grant index as defined in [15]. | REL-8 |
| >>E-DCH Transmission Time Interval | MP | | Integer(2, 10) | Unit is ms. | REL-8 |
| >>E-AGCH Info | MP | | E-AGCH Info 10.3.6.100 | | REL-8 |
| >>HARQ info for E-DCH | MP | | HARQ info for E-DCH 10.3.5.7d | | REL-8 |

| | | | | |
|---|---|---|---|---|
| >>Uplink DPCH power control info | MP | | Uplink DPCH power control info for Common E-DCH 10.3.6.91a | REL-8 |
| >>E-DPCCH info | MP | | E-DPCCH Info 10.3.6.98 | | REL-8 |
| >>E-DPDCH info | MP | | E-DPDCH info 10.3.6.99 | | REL-8 |
| >>F-DPCH TPC command error rate target | MP | | Real (0.01 . . . 0.1 by step of 0.01). | Downlink F-DPCH information. The actual value of dl-FDPCH-TPCcommandErrorRate = IE value * 0.01 | REL-8 |
| >>Additional E-DCH transmission back off | MP | | Integer (0 . . . 15) | In terms of TTIs. | REL-8 |
| >>Maximum E-DCH resource allocation for CCCH | MP | | Enumerated (8, 12, 16, 24, 32, 40, 80, 120) | In terms of TTIs. | REL-8 |
| >>Maximum period for collision resolution phase | MP | | Integer (8 . . . 24) | In terms of TTIs. | REL-8 |
| >>E-DCH transmission continuation back off | MP | | Enumerated (0, 8, 16, 24, 40, 80, 120, infinity) | In terms of TTIs. If set to "infinity", implicit common E-DCH resource release is disabled. | REL-8 |
| >>ACK/NACK support on HS-DPCCH | MP | | Boolean | TRUE indicates that HS-DPCCH shall be used when a common E-DCH resource is allocated to the UE for DTCH/DCCH transmission after collision resolution. FALSE indicates that HS-DPCCH shall not be used | REL-8 |
| >>Measurement Feedback Info | OP | | Measurement Feedback Info 10.3.6.40a | | REL-8 |
| >>Common E-DCH Resource Configuration information list | MP | 1 to <maxEDCHs> | | | REL-8 |
| >>>Soffset | MD | | Integer(0 . . . 9) | (0 . . . 9) indicates symbol offset as defined in [26] Note3 | REL-8 |
| >>>F-DPCH Code number | CV-Short | | Integer (0 . . . 255) | If this IE isnot present, the valueis equal to the last occurrence of this IE. | REL-8 |
| >>>E-RGCH Information | OP | | E-RGCH Info 10.3.6.102 | | REL-8 |
| >>>E-HICH info for common E-DCH | MP | | E-HICH info for common E-DCH 10.3.6.1xx | | REL-8 |
| >>>Uplink DPCH code info | MP | | Uplink DPCH code info for Common E-DCH 10.3.6.87b | | REL-8 |
| >TDD | | | | | REL-8 |
| >>CHOICE TDD option | MP | | | | REL-8 |
| >>>7.68 Mcps TDD | | | NULL | | REL-8 |
| >>>3.84 Mcps TDD | | | NULL | | REL-8 |
| >>>1.28 Mcps TDD | | | | | REL-8 |
| >>>>E-RUCCH Info | MP | | E-RUCCH Info 1.28 Mcps TDD 10.3.6.103a | | REL-8 |

| Information Element/Group name | Need | Multi | Type and reference | Semantics description | Version |
|---|---|---|---|---|---|
| >>>>E-PUCH info | MP | | E-PUCH Info 1.28 Mcps TDD 10.3.6.104a | Note1 | REL-8 |
| >>>>E-HICH info | MP | | E-HICH info 1.28 Mcps TDD 10.3.6.101a | Note1 | REL-8 |
| >>>>E-AGCH Info | MP | | E-AGCH Info 1.28 Mcps TDD 10.3.6.100a | Note1 | REL-8 |
| >>>>HARQ info for E-DCH | MP | | HARQ info for E-DCH 10.3.5.7d | | REL-8 |
| >>>>CCCH transmission info | MP | | | Note2 | REL-8 |
| >>>>>Common E-RNTI info | MP | | Common E-RNTI info 10.3.3.7a | | REL-8 |
| >>>>>HARQ maximum number of retransmissions | MP | | Integer (0 ... 7) | | REL-8 |
| >>>>>HARQ retransmission timer | MP | | Enumerated (10, 15, 20, 25, 30, 35, 40, 45, 50, 55, 60, 65, 70, 75, 80, 85, 90, 95, 100, 110, 120, 140, 160) | Unit: ms | REL-8 |
| >>>>>HARQ power offset | MP | | Integer(0 ... 6) | | REL-8 |

| Condition | Explanation |
|---|---|
| Short | This IE is mandatory present for the first occurrence. Otherwise, this IE is optional. |

NOTE1:
These IEs correspond to the HS-DSCH configuration for CELL_FACH, CELL_PCH and URA_PCH state on primary frequency, the configuration on secondary frequency is signalled to UE via dedicated signalling.
NOTE2:
These IEs correspond to CCCH transmission configuration for CELL_FACH state on the primary frequency and secondary frequency.
NOTE3:
The default value is defined by:
Soffset =(offset +common E-DCH resource list position) mod 10 where "offset" is the value of the last instance of the IE "Soffset". If the IE "Soffset" was not present in the first instance, "offset" is equal to zero.
"common E-DCH resource list position" indicates the Common E-DCH resource Configuration Information number by order of appearance. The value of the "common E-DCH resource list position" is zero for the first instance.

PRACH Preamble Control Parameters (for Enhanced Uplink)

| Information Element/Group name | Need | Multi | Type and reference | Semantics description | Version |
|---|---|---|---|---|---|
| Available Signature | MD | | Bit string(16) | The default value is the inverse bitstring indicated in theIE "Available Signature" in the IE "PRACH Info (for RACH)". Each bit indicates availability for a signature. Each available signature on the AICH is associated with one CommonE-DCH Resource Configuration in the "Common E-DCH resource configuration information list". | REL-8 |

-continued

| Information Element/Group name | Need | Multi | Type and reference | Semantics description | Version |
|---|---|---|---|---|---|
| E-AI Indication | MP | | BOOLEAN | TRUE: E-AIs are in use on the AICH. FALSE: E-AIs are not in use on the AICH. | REL-8 |
| Preamble scrambling code number | MD | | Integer (0 . . . 15) | The default value is the value indicated in the IE "Preamble scrambling code number" in the IE "PRACH Info (for RACH)". Identification of scrambling code, see [28] | REL-8 |
| Available Sub Channel Number | MD | | Bit string(12) | The default value is the same value indicated in the IE "Available Signatures" in the IE "PRACH system information list". Each bit indicates availability for a subchannel, where the subchannels are numbered "subchannel 0" to "subchannel 11". The value 1 of a bit indicates that the corresponding subchannel is available and the value 0 indicates that it is not available. | REL-8 |
| PRACH partitioning | MD | | PRACH partitioning 10.3.6.53 | Default value is the value of "PRACH partitioning" in the first occurrence in list "PRACH system information list" in SIB5 or SIB5bis. | REL-8 |
| Persistence scaling factors | OP | | Persistence scaling factors 10.3.6.48 | This IE shall not be present if only ASC 0 and ASC 1 are defined. If this IE is absent, default value is the value of "Persistence scaling factors" in the first occurrence in list "PRACH system information list" in SIB5 or SIB5bis, if value exists | REL-8 |
| AC-to-ASC mapping | MD | | AC-to-ASC mapping 10.3.6.1 | Default value is the value of "AC-to-ASC mapping" in the first occurrence in list "PRACH system information list" in SIB5 or SIB5bis. | REL-8 |
| Primary CPICH TX power | MD | | Primary CPICH TX power 10.3.6.61 | Default value is the value of "Primary CPICH TX power" in the first occurrence in list "PRACH system information list" in SIB5 or SIB5bis. | REL-8 |
| Constant value | MD | | Constant value 10.3.6.11 | Default value is the value of "Constant value" in the first occurrence in list "PRACH system information list" in SIB5 or SIB5bis | REL-8 |

-continued

| Information Element/Group name | Need | Multi | Type and reference | Semantics description | Version |
|---|---|---|---|---|---|
| PRACH power offset | MD | | PRACH power offset 10.3.6.54 | Default value is the value of "PRACH power offset" in the first occurrence in list "PRACH system information list" in SIB5 or SIB5bis | REL-8 |
| PRACH transmission parameters | MD | | RACH transmission parameters 10.3.6.67 | Default value is the value of "RACH transmission parameters" in the first occurrence in list "PRACH system information list" in SIB5 or SIB5bis. | REL-8 |
| AICH info | MD | | AICH info 10.3.6.2 | Default value is the value of "AICH info" in the first occurrence in list "PRACH system information list" in SIB5 or SIB5bis. | REL-8 |
| Power offset Pp-e | MP | | Integer(−5 ... 10) | In dB. Power offset between the last transmitted preamble and the initial DPCCH transmission as defined in [26] | REL-8 |

E-DPDCH Info

| Information Element/Group name | Need | Multi | Type and reference | Semantics description | Version |
|---|---|---|---|---|---|
| E-TFCI table index | MP | | Integer (0 ... 1) | Indicates which standardised E-TFCI TB size table shall be used. See Note 3. | REL-6 |
| E-DCH minimum set E-TFCI | MD | | Integer (0 ...127) | See [15]; Absence means no E-DCH minimum set. In CELL FACH and Idle Mode, the default value is 1. | REL-6 |
| Reference E-TFCIs | MP | 1 to 8 | | See [29] | REL-6 |
| >Reference E-TFCI | MP | | Integer (0 ... 127) | | REL-6 |
| >Reference E-TFCI PO | MP | | Integer (0 ... 29, | Refer to quantization of the power offset in [28] | REL-6 |
| | | | 30, 31) | Values 30 and 31 are only used for E-TFCI > ETFCI Boost | REL-7 |
| Minimum reduced E-DPDCH gain factor | OP | | Enumerated (8/15, 11/15, 15/15, 21/15, 30/15, 42/15, 60/15, 84/15) | $\beta_{ed, k, reduced, min}$ [29]; the default value is 8/15. If the configurable reduced E-DPDCH gain factor is not supported by the UE, the default value is used. | REL-8 |
| Maximum channelisation codes | MP | | Enumerated (sf256, sf128, sf64, sf32, | | REL-6 |

| Information Element/Group name | Need | Multi | Type and reference | Semantics description | Version |
|---|---|---|---|---|---|
| | | | sf16, sf8, sf4, 2sf4, 2sf2, 2sf2and2sf4) | | |
| $PL_{non-max}$ | MP | | Real (0.44 ... 1.0 by step of 0.04) | As defined in [27] | REL-6 |
| Scheduling Information Configuration | MP | | | | REL-6 |
| >Periodicity for Scheduling Info - no grant | MD | | Enumerated (everyEDCHT TI, 4, 10, 20, 50, 100, 200, 500, 1000) | Values in ms. Default value is "no report" NOTE 1. | REL-6 |
| >Periodicity for Scheduling Info - grant | MD | | Enumerated (everyEDCHT TI, 4, 10, 20, 50, 100, 200, 500, 1000) | Values in ms. Default value is "no report" NOTE 1. | REL-6 |
| >Power Offset for Scheduling Info | MP | | Integer (0 ... 6) | Only used when no MACd PDUs are included in the same MACe PDU. Unit is in dB. | REL-6 |
| 3-Index-Step Threshold | MD | | Integer (0 ... 37) | Refers to an index in the "SG-Table" (see [15]). Default value is 0. NOTES 2, 3. | REL-6 |
| 2-Index-Step Threshold | MD | | Integer (0 ... 37) | Refers to an index in the "SG-Table" (see [15]). Default value is 0. NOTES 2, 3. | REL-6 |

NOTE 1:
If the Periodicity is set to 4 ms and the E-DCH TTI is set to 10 ms, the UE shall interpret the periodicity value as 10 ms.
NOTE 2:
If the 3-index-Step Threshold value is greater than 2-index-Step Threshold, the UE behaviour is unspecified.
NOTE 3:
If the UE is operating in 16QAM mode, the value of "E-TFCI table index" is increased by 2, and indices in the SG-Table refer to Scheduling Grant Table 2 in [15].

E-HICH Info for Common E-DCH

| Information Element/Group name | Need | Multi | Type and reference | Semantics description | Version |
|---|---|---|---|---|---|
| Channelisation Code | CV-Short | | Integer (0...127) | If this IE is not present, the value is equal to the last occurrence of this IE. | REL-8 |
| Signature Sequence | MD | | Integer (0...39) | Note1 | REL-8 |

| | |
|---|---|
| Short | This IE is mandatory present for the first occurrence. Otherwise, this IE is optional. |

NOTE1:

The default value is defined by: Signature Sequence = (offset + common E-DCH resource list position) mod 40 where "offset" is the value of the last occurrence of the IE "Signature Sequence". If "Signature Sequence" was not present in the first occurrence, "offset" is equal to zero. "common E-DCH resource list position" indicates the Common E-DCH resource Configuration Information number by order of appearance. The value of the "common E-DCH resource list position" is zero for the first instance.

Uplink DPCH Code Info for Common E-DCH

| Information Element/Group name | Need | Multi | Type and reference | Semantics description | Version |
|---|---|---|---|---|---|
| Scrambling code type | MP | | Enumerated(short, long) | | REL-8 |
| Scrambling code number | CV-Short | | Integer(0 ... 16777215) | Note1 | REL-8 |

| Condition | Explanation |
|---|---|
| Short | This IE is mandatory present for the first occurrence. Otherwise, this IE is optional. |

NOTE1:
If this IE is not included, the value is given by: Scrambling code number = offset + common E-DCH resource list position where "offset" is the value of the last occurrence of the IE "scrambling code number". If the IE "scrambling code number" is not present in the first occurrence, "offset" is equal to zero. "common E-DCH resource list position" indicates the Common E-DCH resource Configuration Information number by order of appearance. The value of the "common E-DCH resource list position" is zero for the first instance.

The ASN.1 code would need to be updated as it follows
(only relevant IEs have been added):

```
SysInfoType5 ::=                    SEQUENCE {
    sib6indicator                   BOOLEAN,
-- Physical channel IEs
    pich-PowerOffset                PICH-PowerOffset,
    modeSpecificInfo                CHOICE {
        fdd                         SEQUENCE {
            aich-PowerOffset        AICH-PowerOffset
        },
        tdd                         SEQUENCE {
-- If PDSCH/PUSCH is configured for 1.28Mcps or 7.68Mcps TDD, the following IEs should be
absent
-- and the info included in the respective tdd128SpecificInfo or tdd768SpecificInfo
instead.
-- If PDSCH/PUSCH is configured for 3.84Mcps TDD in R5, HCR-r5-SpecificInfo should also be
-- included.
            pusch-SysInfoList-SFN       PUSCH-SysInfoList-SFN       OPTIONAL,
            pdsch-SysInfoList-SFN       PDSCH-SysInfoList-SFN       OPTIONAL,
            openLoopPowerControl-TDD    OpenLoopPowerControl-TDD
        }
    },
    primaryCCPCH-Info               PrimaryCCPCH-Info               OPTIONAL,
    prach-SystemInformationList     PRACH-SystemInformationList,
    sCCPCH-SystemInformationList    SCCPCH-SystemInformationList,
-- cbs-DRX-Level1Information is conditional on any of the CTCH indicator IEs in
-- sCCPCH-SystemInformationList
    cbs-DRX-Level1Information       CBS-DRX-Level1Information       OPTIONAL,
-- Extension mechanism for non- release99 information
    v4b0NonCriticalExtensions       SEQUENCE {
        sysInfoType5-v4b0ext        SysInfoType5-v4b0ext-IEs        OPTIONAL,
-- Extension mechanism for non- rel-4 information
        v590NonCriticalExtensions           SEQUENCE {
            sysInfoType5-v590ext            SysInfoType5-v590ext-IEs        OPTIONAL,
            v650NonCriticalExtensions       SEQUENCE {
                sysInfoType5-v650ext        SysInfoType5-v650ext-IEs            OPTIONAL,
                v680NonCriticalExtensions   SEQUENCE {
                    sysInfoType5-v680ext        SysInfoType5-v680ext-IEs
OPTIONAL,
                    v690NonCriticalExtensions       SEQUENCE {
                        sysInfoType5-v690ext            SysInfoType5-v690ext-IEs,
                        v770NonCriticalExtensions       SEQUENCE {
                            sysInfoType5-v770ext            SysInfoType5-v770ext-IEs,
                            v860NonCriticalExtensions       SEQUENCE {
                                sysInfoType5-v860ext            SysInfoType5-v860ext-IEs,
                                v890NonCriticalExtensions       SEQUENCE {
                                    sysInfoType5-v890ext            SysInfoType5-v890ext-
IEs,
                                    v8b0NonCriticalExtensions       SEQUENCE {
                                        sysInfoType5-v8b0ext SysInfoType5-v8b0ext-
IEs,
                                        v8c0NonCriticalExtensions           SEQUENCE {
                                            sysInfoType5-v8c0ext
                                            nonCriticalExtensions           SEQUENCE { }
OPTIONAL
                                        }   OPTIONAL
```

```
                }   OPTIONAL
              }   OPTIONAL
            }   OPTIONAL
          }   OPTIONAL
        }   OPTIONAL
      }   OPTIONAL
    }   OPTIONAL
  }   OPTIONAL
}   OPTIONAL
}
SysInfoType5-v890ext-IEs ::= SEQUENCE {
    secondFrequencyInfo              FrequencyInfoTDD              OPTIONAL,
    -- The field 'dummy' shall be marked absent in SysInfoType5 and SysInfoType5bis. A failure to
    -- comply with this requirement may prevent the UE to receive any service in the cell. The UE
    -- may treat the cell as barred.
    dummy              SEQUENCE { }              OPTIONAL
}
SysInfoType5-v8c0ext-IEs ::= SEQUENCE {
    commonEDCHSystemInfo              CommonEDCHSystemInfo   OPTIONAL
}
PRACH-PreambleForEnhancedUplink ::=    SEQUENCE {
    availableSignatures                 AvailableSignatures                OPTIONAL,
    e-ai-Indication                     BOOLEAN,
    preambleScramblingCodeWordNumber    PreambleScramblingCodeWordNumber   OPTIONAL,
    availableSubChannelNumbers          AvailableSubChannelNumbers         OPTIONAL,
    prach-Partitioning                  PRACH-Partitioning-r7              OPTIONAL,
    persistenceScalingFactorList        PersistenceScalingFactorList       OPTIONAL,
    ac-To-ASC-MappingTable              AC-To-ASC-MappingTable             OPTIONAL,
    primaryCPICH-TX-Power               PrimaryCPICH-TX-Power              OPTIONAL,
    constantValue                       ConstantValue                      OPTIONAL,
    prach-PowerOffset                   PRACH-PowerOffset                  OPTIONAL,
    rach-TransmissionParameters         RACH-TransmissionParameters        OPTIONAL,
    aich-Info                           AICH-Info                          OPTIONAL,
    powerOffsetPp-e                     INTEGER (-5..10)
}
Common-E-DCH-ResourceInfoList ::=    SEQUENCE {
    s-offset                            INTEGER (0..9)                     OPTIONAL,
    f-dpch-ChannelisationCodeNumber     INTEGER (0..255)                   OPTIONAL,
    e-RGCH-Information                  E-RGCH-Information                 OPTIONAL,
    e-hich-Info                         E-HICH-Information-CommonEdch,
    ul-DPCH-CodeInfoForCommonEDCH       UL-DPCH-CodeInfoForCommonEDCH
}
UL-DPCH-CodeInfoForCommonEDCH ::=    SEQUENCE {
    ul-DPCCHscramblingCodeType          ScramblingCodeType,
    ul-DPCCHscramblingCode              UL-ScramblingCode                  OPTIONAL
}
E-HICH-Information-CommonEdch ::=    SEQUENCE {
    channelisationCode                  E-HICH-ChannelisationCode          OPTIONAL,
    signatureSequence                   E-HICH-RGCH-SignatureSequence      OPTIONAL
}
```

In some embodiments, a second approach may be taken to provide a backward compatible solution.

In this case a new IE is added in SIB5, "Common E-DCH System Info Short", for instance. This IE would contain the new encoding.

The tabular of SIB5 would be as follows:

System Information Block Type 5 and 5Bis

| Information Element/Group name | Need | Multi | Type and reference | Semantics description | Version |
|---|---|---|---|---|---|
| SIB6 Indicator | MP | | Boolean | TRUE indicates that SIB6 is broadcast in the cell. When the UE receives SIB5 in the System Information Container message, this IE is interpreted as FALSE | |

-continued

| Information Element/Group name | Need | Multi | Type and reference | Semantics description | Version |
|---|---|---|---|---|---|
| PhyCH information elements | | | | | |
| PICH Power offset | MP | | PICH Power offset 10.3.6.50 | If the cell is operating in MBSFN mode as indicated in subclause 8.1.1.6.3 the UE behaves as if this IE would not have been received. | |
| CHOICE mode | MP | | | | |
| >FDD | | | | | |
| >>AICH Power offset | MP | | AICH Power offset 10.3.6.3 | If the cell is operating in MBSFN mode as indicated in subclause 8.1.1.6.3 the UE behaves as if this IE would not have been received. | |
| >TDD | | | | | |
| >>PUSCH system information | OP | | PUSCH system information 10.3.6.66 | If the cell is operating in MBSFN mode as indicated in subclause 8.1.1.6.3 the UE behaviour upon reception of this IE is unspecified. | |
| >>PUSCH system information VHCR | OP | | PUSCH system information VHCR 10.3.6.66a | Only for 7.68 Mcps TDD If the cell is operating in MBSFN mode as indicated in subclause 8.1.1.6.3 the UE behaviour upon reception of this IE is unspecified. | REL-7 |
| >>PDSCH system information | OP | | PDSCH system information 10.3.6.46 | If the cell is operating in MBSFN mode as indicated in subclause 8.1.1.6.3 the UE behaviour upon reception of this IE is unspecified. | |
| >>TDD open loop power control | MP | | TDD open loop power control 10.3.6.79 | If the cell is operating in MBSFN mode as indicated in subclause 8.1.1.6.3 the UE behaves as if this IE would not have been received. | |
| Primary CCPCH info | OP | | Primary CCPCH info 10.3.6.57 | Note 1 | |
| PRACH system information list | MP | | PRACH system information list 10.3.6.55 | If the cell is operating in MBSFN mode as indicated in subclause 8.1.1.6.3 the UE behaves as if this IE would not have been received. | |
| Common E-DCH system info | OP | | Common E-DCH system info 10.3.6.9a | | REL-8 |
| Common E-DCH system info short | OP | | Common E-DCH system info short 10.3.6.9b | | REL-8 |
| Secondary CCPCH system information | MP | | Secondary CCPCH system information 10.3.6.72 | Note 2 If the cell is operating in MBSFN mode as indicated in subclause 8.1.1.6.3 the UE behaves as if this IE | |

| Information Element/Group name | Need | Multi | Type and reference | Semantics description | Version |
|---|---|---|---|---|---|
| | | | | would not have been received. | |
| CBS DRX Level 1 information | CV-CTCH | | CBS DRX Level 1 information 10.3.8.3 | | |
| Frequency band indicator | OP | | Frequency band indicator 10.3.6.35b | | REL-6 |
| Frequency band indicator 2 | OP | | Frequency band indicator 2 10.3.6.35c | | REL-6 |
| HSDPA cell Indicator | MD | | Enumerated (HSDPA Capable Cell) | Default is 'HSDPA capability not indicated'. 'HSDPA Capable Cell' means that the UE may consider this cell as part of the HSDPA coverage area for display indication only. This indication shall not be used for any other purpose. If the cell is operating in MBSFN mode as indicated in subclause 8.1.1.6.3 the UE behaves as if this IE would not have been received. | REL-6 |
| E-DCH cell Indicator | MD | | Enumerated (E-DCH Capable Cell) | Default is 'E-DCH capability not indicated'. 'E-DCH Capable Cell' means that the UE may consider this cell as part of the E-DCH coverage area for display indication only. This indication shall not be used for any other purpose. If the cell is operating in MBSFN mode as indicated in subclause 8.1.1.6.3 the UE behaves as if this IE would not have been received. | REL-6 |
| Secondary CCPCH system information MBMS | OP | | Secondary CCPCH system information MBMS 10.3.6.72a | Included if MCCH is on an S-CCPCH used only for MBMS. Note 2 | REL-6 |
| CHOICE mode | OP | | | | REL-7 |
| >FDD | | | | | REL-7 |
| >>HS-DSCH common system information | MP | | HS-DSCH common system information 10.3.6.36c | Included if cell supports HS-DSCH reception in CELL_FACH and during IDLE to RRC Connection state transition. | REL-7 |
| >>HS-DSCH paging system information | OP | | HS-DSCH paging system information 10.3.6.36d | Included if cell supports for UEs in RRC Connected state paging message reception on HS-DSCH. | REL-7 |
| >TDD | | | | | REL-7 |
| >>HS-DSCH common system information | MP | | HS-DSCH common system information 1.28 Mcps | Included if cell supports HS-DSCH reception in CELL_FACH and during IDLE to RRC Connection state | REL-8 |

-continued

| Information Element/Group name | Need | Multi | Type and reference | Semantics description | Version |
|---|---|---|---|---|---|
| | | | TDD 10.3.6.36ca | transition. | |
| >>HS-DSCH paging system information | OP | | HS-DSCH paging system information 1.28 Mcps TDD 10.3.6.36da | Included if cell supports for UEs in RRC Connected state paging message reception on HS-DSCH. | REL-8 |
| TDD MBSFN information | OP | | TDD MBSFN Information 10.3.6.78b | TDD only: included only if some timeslots are designated to MBSFN. | REL-7 |
| HS-DSCH DRX in CELL_FACH Information | OP | | HS-DSCH DRX in CELL_FACH Information 10.3.6.36g | | REL-8 |
| HS-DSCH DRX in CELL_FACH Information 1.28 Mcps TDD | OP | | HS-DSCH DRX in CELL_FACH Information 1.28 Mcps TDD 10.3.6.36h | | REL-8 |
| Second Frequency info | OP | | Integer (0 . . . 16383) | Note3 | REL-8 |
| Treset Usage Indicator | OP | | Enumerated (TRUE) | Only for 1.28 Mcps TDD. The presence of this IE means the timer Treset is not valid when the dedicated H-RNTI is configured in CELL_FACH and CELL_PCH. | REL-8 |
| UpPCH Position Info | CV-Frequency | | Integer (0 . . . 127) | Only for 1.28 Mcps TDD. | REL-8 |

The new IE would be defined as follows:
Common E-DCH system info short
NOTE: Only for FDD.

| Information Element/Group name | Need | Multi | Type and reference | Semantics description | Version |
|---|---|---|---|---|---|
| UL interference for common E-DCH | CV-Optional | | UL interference 10.3.6.87 | | REL-8 |
| Common E-DCH MAC-d flows | CV-Mandatory | | Common E-DCH MAC-d flows 10.3.5.3b | | REL-8 |
| PRACH preamble control parameters (for Enhanced Uplink) | CV-Mandatory | | PRACH preamble control parameters (for Enhanced Uplink) 10.3.6.54a | Control parameters of the physical signal. | REL-8 |
| Initial Serving grant value | CV-Mandatory | | Integer (0 . . . 37) | (0 . . . 37) indicates E-DCH serving grant index as defined in [15]. | REL-8 |
| E-DCH Transmission Time Interval | CV-Mandatory | | Integer(2, 10) | Unit is ms. | REL-8 |
| E-AGCH Info | CV-Mandatory | | E-AGCH Info 10.3.6.100 | | REL-8 |
| HARQ info for E-DCH | CV-Mandatory | | HARQ info for E-DCH 10.3.5.7d | | REL-8 |

-continued

| | | | | |
|---|---|---|---|---|
| Uplink DPCH power control info | CV-Mandatory | | Uplink DPCH power control info for Common E-DCH 10.3.6.91a | REL-8 |
| E-DPCCH info | CV-Mandatory | | E-DPCCH Info 10.3.6.98 | REL-8 |
| E-DPDCH info | CV-Mandatory | | E-DPDCH info 10.3.6.99 | REL-8 |
| F-DPCH TPC command error rate target | CV-Mandatory | | Real (0.01 . . . 0.1 by step of 0.01). | Downlink F-DPCH information. The actual value of dl-FDPCH-TPCcommandErrorRate = IE value * 0.01 | REL-8 |
| Additional E-DCH transmission back off | CV-Mandatory | | Integer (0 . . . 15) | In terms of TTIs. | REL-8 |
| Maximum E-DCH resource allocation for CCCH | CV-Mandatory | | Enumerated (8, 12, 16, 20, 24, 32, 40, 80) | In terms of TTIs. | REL-8 |
| Maximum period for collision resolution phase | CV-Mandatory | | Integer (8 . . . 24) | In terms of TTIs. | REL-8 |
| E-DCH transmission continuation back off | CV-Mandatory | | Enumerated (0, 4, 8, 16, 24, 40, 80, infinity) | In terms of TTIs. If set to "infinity", implicit common E-DCH resource release is disabled. | REL-8 |
| ACK/NACK support on HS-DPCCH | CV-Mandatory | | Boolean | TRUE indicates that HS-DPCCH shall be used when a common E-DCH resource is allocated to the UE for DTCH/DCCH transmission after collision resolution. FALSE indicates that HS-DPCCH shall not be used | REL-8 |
| Measurement Feedback Info | CV-Optional | | Measurement Feedback Info 10.3.6.40a | | REL-8 |
| Common E-DCH Resource Configuration information list | MP | 1 to <maxEDCHs> | | | REL-8 |
| >Sofsset | MD | | Integer(0 . . . 9) | (0 . . . 9) indicates symbol offset as defined in [26] Note3 | REL-8 |
| >F-DPCH Code number | CV-Short | | Integer (0 . . . 255) | If this IE is not present, the value is equal to the last occurrence of this IE. | REL-8 |
| >E-RGCH Information | CV-Short | | E-RGCH Info 10.3.6.102 | | REL-8 |
| >E-HICH info for common E-DCH | MD | | E-HICH info for common E-DCH 10.3.6.1xx | | REL-8 |
| >Uplink DPCH code info | MD | | Uplink DPCH code info for Common E-DCH 10.3.6.87b | | REL-8 |

| Condition | Explanation |
|---|---|
| Optional | If the IE "Common E-DCH System Info" is present, the value of the IE is the same value of corresponding IE in the IE "Common E-DCH system info". Otherwise, this IE is optional. |
| Short | This IE is mandatory present for the first occurrence. Otherwise, this IE is optional. |

|  |  |
|---|---|
| Mandatory | If the IE "Common E-DCH System Info" is present, the value of the IE is the same value of the corresponding IE in the IE "Common E-DCH System Info". Otherwise, this IE is mandatory present. |

NOTE1:
These IEs correspond to the HS-DSCH configuration for CELL_FACH, CELL_PCH and URA_PCH state on primary frequency, the configuration on secondary frequency is signalled to UE via dedicated signalling.

NOTE2:
These IEs correspond to CCCH transmission configuration for CELL_FACH state on the primary frequency and secondary frequency.

NOTE3:
The default value is defined by: Soffset = (offset + common E-DCH resource list position) mod 10 where "offset" is the value of the last instance of the IE "Soffset". If the IE "Soffset" was not present in the first instance, "offset" is equal to zero. "common E-DCH resource list position" indicates the Common E-DCH resource Configuration Information number by order of appearance. The value of the "common E-DCH resource list position" is zero for the first instance.

Additional conditions are placed in other to reduce the signalling in case the IE "Common E-DCH System Info" is included. The affected IEs are shown below:

PRACH Preamble Control Parameters (for Enhanced Uplink)

| Information Element/Group name | Need | Multi | Type and reference | Semantics description | Version |
|---|---|---|---|---|---|
| Available Signature | MD |  | Bit string(16) | The default value is the inverse bitstring indicated in the IE "Available Signature" in the IE "PRACH Info (for RACH)". Each bit indicates availability for a signature. Each available signature on the AICH is associated with one CommonE-DCH Resource Configuration in the "Common E-DCH resource configuration information list". | REL-8 |
| E-AI Indication | MP |  | BOOLEAN | TRUE: E-AIs are in use on the AICH. FALSE: E-AIs are not in use on the AICH. | REL-8 |
| Preamble scrambling code number | MD |  | Integer (0 ... 15) | The default value is the value indicated in the IE "Preamble scrambling code number" in the IE "PRACH Info (for RACH)". Identification of scrambling code, see [28] | REL-8 |
| Available Sub Channel Number | MD |  | Bit string(12) | The default value is the same value indicated in the IE "Available Signatures" in the IE "PRACH system information list". Each bit indicates availability for a subchannel, where the subchannels are numbered "subchannel 0" to "subchannel 11". The value 1 of a bit indicates that the corresponding subchannel is available and the | REL-8 |

-continued

| Information Element/Group name | Need | Multi | Type and reference | Semantics description | Version |
|---|---|---|---|---|---|
| PRACH partitioning | MD | | PRACH partitioning 10.3.6.53 | value 0 indicates that it is not available. Default value is the value of "PRACH partitioning" in the first occurrence in list "PRACH system information list" in SIB5 or SIB5bis. | REL-8 |
| Persistence scaling factors | OP | | Persistence scaling factors 10.3.6.48 | This IE shall not be present if only ASC 0 and ASC 1 are defined. If this IE is absent, default value is the value of "Persistence scaling factors" in the first occurrence in list "PRACH system information list" in SIB5 or SIB5bis, if value exists | REL-8 |
| AC-to-ASC mapping | MD | | AC-to-ASC mapping 10.3.6.1 | Default value is the value of "AC-to-ASC mapping" in the first occurrence in list "PRACH system information list" in SIB5 or SIB5bis. | REL-8 |
| Primary CPICH TX power | MD | | Primary CPICH TX power 10.3.6.61 | Default value is the value of "Primary CPICH TX power" in the first occurrence in list "PRACH system information list" in SIB5 or SIB5bis. | REL-8 |
| Constant value | MD | | Constant value 10.3.6.11 | Default value is the value of "Constant value" in the first occurrence in list "PRACH system information list" in SIB5 or SIB5bis | REL-8 |
| PRACH power offset | MD | | PRACH power offset 10.3.6.54 | Default value is the value of "PRACH power offset" in the first occurrence in list "PRACH system information list" in SIB5 or SIB5bis | REL-8 |
| PRACH transmission parameters | MD | | RACH transmission parameters 10.3.6.67 | Default value is the value of "RACH transmission parameters" in the first occurrence in list "PRACH system information list" in SIB5 or SIB5bis. | REL-8 |
| AICH info | MD | | AICH info 10.3.6.2 | Default value is the value of "AICH info" in the first occurrence in list "PRACH system information list" in SIB5 or SIB5bis. | REL-8 |
| Power offset Pp-e | MP | | Integer(−5 ... 10) | In dB. Power offset between the last transmitted preamble and the initial DPCCH transmission as defined in [26] | REL-8 |

E-HICH Info Common for E-DCH

| Information Element/Group name | Need | Multi | Type and reference | Semantics description | Version |
|---|---|---|---|---|---|
| Channelisation Code | CV-Short | | Integer (0...127) | For the first occurrence, if this IE is not present, the value of this IE is the value of last occurrence of the IE "Channelisation Code" present in the IE "Common E-DCH system info". For subsequent occurrences, if the IE is not present, the value is equal to the last occurrence of this IE. | REL-8 |
| Signature Sequence | MD | | Integer (0...39) | Note1 | REL-8 |
| Short | | | If the IE "Common E-DCH system info" is not present, this IE is mandatory present for the first occurrence. Otherwise, this IE is optional, | | |

NOTE1:
The default value is defined by: Signature Sequence = (offset + common E-DCH resource list position) mod 40 where "offset" is the value of last occurrence of the IE "Signature Sequence". If "Signature Sequence" was not present in the first instance, "offset" is equal to zero. "common E-DCH resource list position" indicates the Common E-DCH resource Configuration Information number by order of appearance. The value of the "common E-DCH resource list position" is zero for the first instance.

The IEs "E-DPCH info" and "Uplink DPCH code info for Common E-DCH" would not change compared with the first solution.

The encoding improvement of each IE present in "Common E-DCH System Info" are independent from other IEs.

Processing alternatively or additionally includes encoding system information that indicates available resources of a contention-based uplink channel relative to other available resources of that channel. In any case, processing finally includes broadcasting the system information to one or more mobile terminals 10.

Step 302. The base station 12 transmits the encoded system information to mobile terminals, e.g. the mobile terminal 10.

Figure 4:
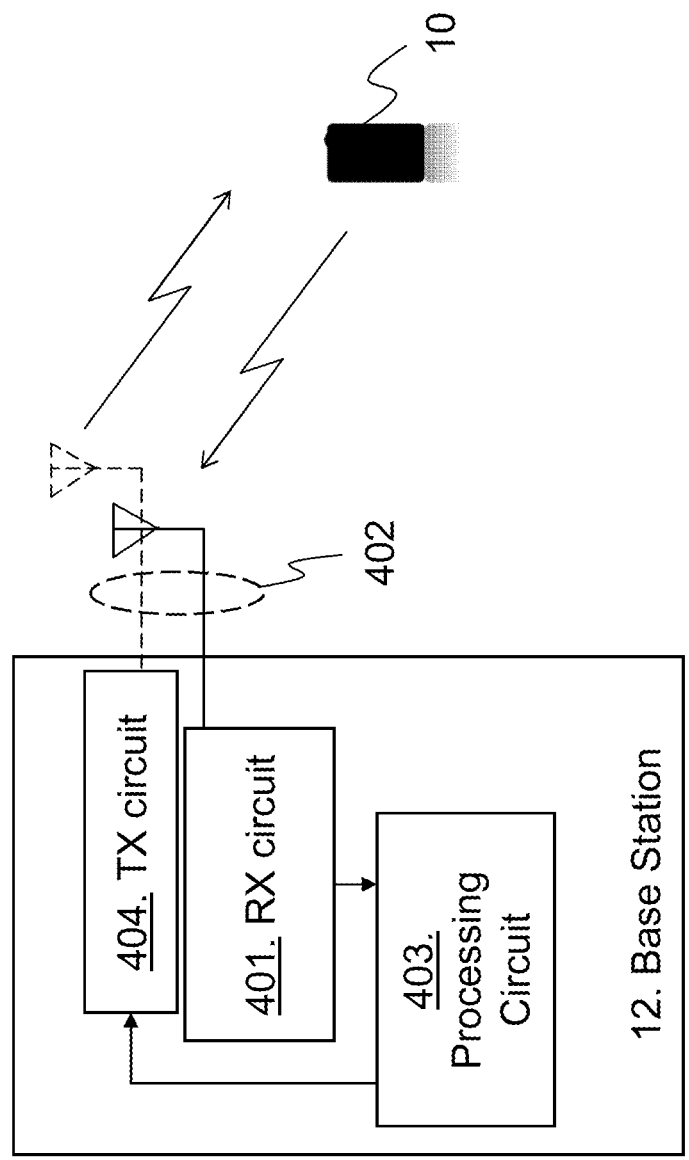
FIG. 4 is a block diagram depicting embodiments of a base station.

FIG. 4 is a block diagram depicting the base station 12 according to embodiments herein. To support the above downlink control signaling, the base station 12 in some embodiments includes one or more transmit/receive antennas 402, along with associated transmitter (TX) circuit 404 and receiver (RX) circuit 401, respectively, and further includes one or more processing circuits 403. The processing circuit 403 is configured to encode system information that directly indicates access request preambles for one of the CB channels and that indirectly indicates access request preambles for the other CB channel based on e.g. as a function of the directly indicated preambles. This may entail, for instance, suppressing encoding that would directly indicate certain access request preambles. The TX circuit 404 is then configured to broadcast the encoded system information to mobile terminals 10-10-N, via the transmit antennas 402.

In some embodiments, the processing circuit 403 of the base station 12 encodes system information that indicates available resources of a CB channel relative to other available resources of that channel, e.g., relative to a position in which other available resources are indicated in the system information, rather than indicating each resource independently. In some embodiments, for example, the available resources are indicated in an ordered list, and the processing circuit 403 encodes the system information to indicate available resources as a function of their position in the list relative to other resources. The TX circuit 404 then broadcasts this system information much in the same way as described above.

Thus, the base station 12 for managing access to the first contention based channel and the second contention based channel comprises the processing circuit 403. The processing circuit 403 is configured to encode system information directly indicating first access request preambles for the first contention based channel, and indirectly indicating second access request preambles for the second contention based channel based on the directly indicated first access request preambles. The base station 12 further comprises the transmitter circuit 404 configured to broadcast the encoded system information to mobile terminals.

In some embodiments the first contention based channel may correspond to a random access channel, RACH, and in some embodiments, the second contention based channel corresponds to a common Enhanced Dedicated Channel, E-DCH. In some embodiments the second access request preambles may be derivable as a function of the first access request preambles. In some embodiments the encoded system information may be comprised in a System Information Block type 5, SIB5.

In some embodiments, the first access request preambles may correspond to Physical Random Access Channel, PRACH, preambles characterised by a signature sequence, a scrambling code, and a sub-channel. In some embodiments the first access request preambles may be indicated in an information element denoted as Physical Random Access Channel, PRACH, info comprised in a PRACH system information list carried in System Information Block type 5, SIB5. The first access request preambles for the first contention based channel may in some embodiments be indicated as available signatures in the information element PRACH info and the second access request preambles for the second contention based channel are indirectly indicated as a function of the first access request preambles in an information element denoted as available signatures in an information element denoted PRACH preamble control parameters for enhanced uplink. In some embodiments a preamble scrambling code number of the second access request preambles may be a preamble scrambling code of the first access request preambles. In some embodiments a preamble scrambling code number of the second access request preambles may be a function of the preamble scrambling code of the first access request preambles. In some embodiments the processing circuit 403 may be configured to set an available sub-channel number of the second access request preambles to be equal, the inverse or a 'not'-function of an available sub-channel number indicated in the information element denoted PRACH info.

In some embodiments the processing circuit 403 may further be configured to encode system information that indicates a second available resource of the second contention based channel relative to a first available resource of the second contention based channel. In some embodiments the second available resource may be indicated in an ordered list of resources as a function of a position of the first available resource in the ordered list. In some embodiments the ordered list may define common Enhanced-Dedicated Channel, E-DCH, resources, which each E-DCH Resource is defined by a Soffset information element, a Fractional Dedicated Physical Control Channel, F-DPCH, code number information element, and an E-DCH Hybrid Automatic Repeat Request Acknowledgement Indicator Channel, E-HICH, info for common E-DCH information element. In some embodiments, the position of the second available resource in the ordered list may be defined by a default value in the Soffset information element. The default value may be a function of the position of the second available resource within the ordered list; a function of a "Soffset" value of a previous first available resource; or a function of the position of the second available resource and an offset value. The offset value may be a Soffset value of the first available resource. In some embodiments, the F-DPCH code number information element may be the same for a maximum of ten common E-DCH resources. In some embodiments the E-HICH info for common E-DCH information element may be defined by a channelization code and a signature sequence. A default value of the signature sequence may be a function of the position of the second available resource within the ordered list; a function of a "Signature Sequence" value of a previous first available resource; or a function of the position of the second available resource and the "Signature Sequence" value of a previous first available resource. In some embodiments a channelization code of the second available resource may be equal to a channelization code of the first available resource. In some embodiments the second available resource may be defined by a value in an information element of a scrambling code of an uplink Dedicated Physical Control Channel. The value may be a function of the position of the second available resource within the ordered list of common E-DCH resources; a function of a value in an information element of a scrambling code of an uplink Dedicated Physical Control Channel of a previous first available resource; or a function of the position of the second available resource and an "Uplink DPCH code info for Common E-DCH" value in the information element of a scrambling code of an uplink Dedicated Physical Control Channel of the previous first available resource.

Those skilled in the art will also appreciate that the various "circuits" described may refer to a combination of analog and digital circuits, and/or one or more processors configured with software and/or firmware, e.g., stored in memory, that, when executed by the one or more processors, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Figure 5:
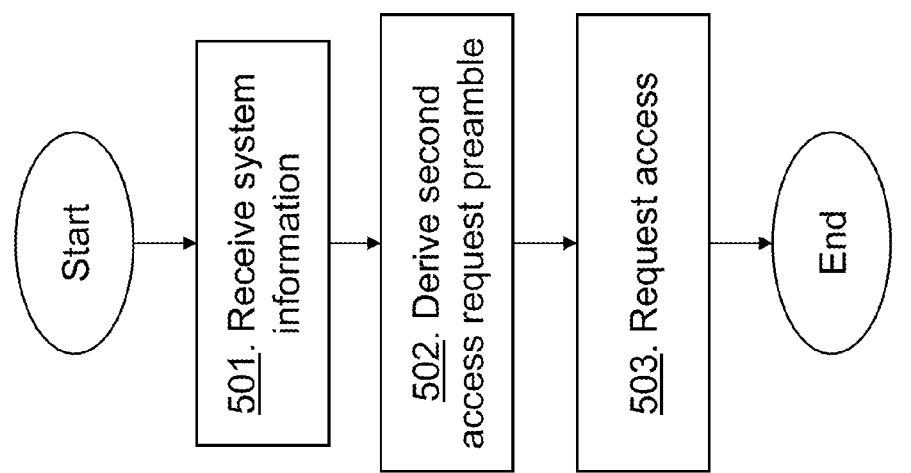
FIG. 5 is a schematic flowchart depicting embodiments of a method in a mobile equipment.

FIG. 5 is a schematic flowchart depicting embodiments of a method in the mobile terminal 10 for requesting access to the wireless communication system. Those skilled in the art will further appreciate that a mobile terminal 10 herein is correspondingly configured to perform the method(s) illustrated in FIG. 5.

Step 501. The mobile terminal 10 receives broadcasted system information directly indicating first access request preambles for a first contention based channel, and indirectly indicating second access request preambles for a second contention based channel. The second access request preambles are indirectly indicated based on the directly indicated first access request preambles. Thus, processing at the mobile terminal 10 includes receiving system information that directly indicates the first access request preambles for the first contention-based uplink channel and indirectly indicates the second access request preambles for the second contention-based uplink channel.

Step 502. The mobile terminal 10 derives the second access request preambles from the first access request preambles. Thus, processing continues by deriving the access request preambles for the second contention-based uplink channel based on, e.g. as a function of, the directly indicated preambles.

Step 503. The mobile terminal 10 then requests access using the second access request preambles or the first access request preambles to access the wireless communication system. E.g. a selected second access request preamble may be transmitted to request access to the second contention-based uplink channel. Processing may further include randomly selecting one of the derived access request preambles. In some embodiments, the mobile terminal 10 randomly selects one of the access request preambles and transmits the randomly selected access request preamble.

The mobile terminal 10 may also be configured to generally perform processing, which may overlap the deriving of the access request preambles, that includes receiving system information that indicates a first available resource of the second contention-based uplink channel. Processing may optionally include in some embodiments randomly selecting an access request preamble corresponding to a second available resource of the second contention-based uplink channel, transmitting the selected preamble, and receiving a positive acknowledgement. Whether or not performed responsive to this optional step, processing comprises deriving system information for a second available resource of the second contention-based uplink channel based on, e.g. as a function of, the first available resource. Finally, processing in various embodiments concludes with transmitting uplink data on the second contention-based uplink channel using the second available resource. Thus, the mobile terminal 10 may randomly select one of the access request preambles and transmit the randomly selected access request preamble.

In some embodiments the first contention based channel corresponds to a random access channel, RACH. In some embodiments the second contention based channel corresponds to a common Enhanced Dedicated Channel, E-DCH. In some embodiments the received system information is comprised in a System Information Block type 5, SIB5.

In more detail, embodiments herein reduce the number of segments used in SIB5 to broadcast the IE "Common E-DCH System Info" which defines the common E-DCH resource parameters. For this purpose, a new coding is proposed for the IEs included in the IE "Common E-DCH System Info" within SIB5. The IE "Common E-DCH System Info" is an optional IE included in SIB5.

Embodiments herein propose modifications to these IEs, as detailed below.

In some embodiments the first access request preambles correspond to Physical Random Access Channel, PRACH, preambles characterised by a signature sequence, a scrambling code, and a sub-channel.

>>PRACH Preamble Control Parameters for Enhanced Uplink

IE that comprises available signatures, Preamble scrambling code numbers, and Available Sub-Channel Number Available Signatures This is a bit string IE and each bit indicates whether a signature is used or not used. The signatures configured for RACH and included in the IE "Available Signatures" present in the IE "PRACH info (for RACH)". These signatures cannot be used for Enhanced Uplink in CELL_FACH and Idle Mode. The IE "PRACH info (for RACH)" is included in the IE "PRACH System Information list" which is carried in SIB5. "PRACH System Information list", "PRACH info (for RACH)" and "Available Signatures" are mandatory present IE. Hence, they will always be included in SIB5. Thus, in some embodiments the first access request preambles are indicated in an information element denoted as Physical Random Access Channel, PRACH, info comprised in a PRACH system information list carried in System Information Block type 5, SIB5.

The IE "Available Signatures" contained in the IE "PRACH preamble control parameters for Enhanced Uplink" is also a mandatory present value; however, in embodiments herein this IE is optional and takes a default value. This default value is the same or a function of another IE, e.g., the "Available Signatures" present in the IE "PRACH info (for RACH)".

As an example, the default value in various embodiments is a "NOT" or "INVERSE" function operation of the bit string values included in "Available Signatures" present in the IE "PRACH info (for RACH)".

An illustrative example is presented to clarify the concept. If the value of the IE "Available Signatures" included in the IE "PRACH info (for RACH)" is: 1111111100000000, then the default value of the IE "Available Signatures" contained in the IE "Common E-DCH System Info" would be the inverse bit operation of (1111111100000000) which is equal to 0000000011111111.

Therefore, the IE "available signatures" is set to mandatory default (MD) and the semantics of the description would say that the default value is the inverse bit-string indicated in the IE "Available Signature" in the IE "PRACH Info (for RACH)". In other words, the available signatures for Enhanced Uplink in CELL_FACH are those signatures which are not used for RACH, unless the IE is present.

Doing so, the base station 12 suppresses including this IE in the IE "PRACH preamble control parameters for Enhanced Uplink" and thereby reduces downlink control signaling. The mobile terminal 10 that may not receive such an IE nevertheless sets the IE to a default value described above. If the IE is present, the signaled values overwrite the default value. Thus, in some embodiments the first access request preambles for the first contention based channel are indicated as available signatures in the information element PRACH info and the second access request preambles for the second contention based channel are indirectly indicated as a function of the first access request preambles in an information element denoted as available signatures in an information element denoted PRACH preamble control parameters for enhanced uplink.

Preamble Scrambling Code Number

This IE is also included in the IE "PRACH info (for RACH)". Embodiments herein teach that the scrambling code for the common E-DCH be the same as that of the RACH, at least by default. If it would be different, the new Preamble scrambling code number in various embodiments is a function of the Preamble scrambling code number present in the IE "PRACH info (for RACH)". Hence, this IE in some embodiments is MD and by default equal to the IE "Preamble scrambling code number" indicated in the IE "PRACH info (for RACH)," and is otherwise a function of the IE "Preamble scrambling code number" indicated in the IE "PRACH info (for RACH)".

As in the previous case, the base station 12 may refrain from including this IE in the IE "PRACH preamble control parameters for Enhanced Uplink" and thereby reduces downlink control signaling. A mobile terminal 10 that does not receive such an IE nevertheless sets the IE to a default value described above. If the IE is present, the signaled values overwrite the default value. Thus, in some embodiments a preamble scrambling code number of the second access request preambles is a preamble scrambling code of the first access request preambles. Alternatively, the preamble scrambling code number of the second access request preambles may be a function of the preamble scrambling code of the first access request preambles.

Available Sub-Channel Number

This IE is a bit string. Each bit indicates availability for a subchannel, where the subchannels are numbered from "subchannel 0" to "subchannel 11". The value 1 of a bit indicates that the corresponding subchannel is available and the value 0 indicates that it is not available.

This IE is also included in the IE "PRACH info (for RACH)". This IE in some embodiments is also set to MD. The mandatory default value is a function of the IE "PRACH info (for RACH)".

For example, this IE may be set equal to the IE "Available Sub-Channel Number" indicated in the IE "PRACH info (for RACH)". In another approach, the default value may be the INVERSE (or NOT) function of the IE Available Sub-Channel Number" indicated in the IE "PRACH info (for RACH)"

As in the previous case, the base station 12 may refrain from including this IE in the IE "PRACH preamble control parameters for Enhanced Uplink" and thereby reduces downlink control signaling. A mobile terminal 10 that does not receive such an IE nevertheless sets the IE to a default value described above. If the IE is present, the signaled values overwrite the default. Thus, in some embodiments an available sub-channel number of the second access request preambles is set to be equal, the inverse or a 'not'-function of an available sub-channel number indicated in the information element denoted PRACH info.

In some embodiments, the base station 12 also reduces downlink control signaling by intelligently broadcasting system information that indicates available resources of a CB channel, e.g., the non-legacy CB channel.

Consider a specific example in 3GPP specifications, whereby available resources comprise a combination of a power control command channel time slot, a power control command channel coding, and the like, with each component of an available resource being indicated relative to a corresponding component of another available resource.

In some embodiments the mobile terminal 10 receives system information that indicates a second available resource of the second contention based channel relative to a first available resource of the second contention based channel. The second available resource may in some embodiments be indicated in an ordered list of resources as a function of a position of the first available resource in the ordered list.

The ordered list may in some embodiments define common Enhanced-Dedicated Channel (E-DCH) resources. Each E-DCH Resource may be defined by a Soffset information element, a Fractional Dedicated Physical Control Channel (F-DPCH) code number information element, and an E-DCH Hybrid Automatic Repeat Request Acknowledgement Indicator Channel (E-HICH) info for common E-DCH information element.

>>Common E-DCH Resource Configuration Information List

This IE is a list which contains all the defined common E-DCH resources. A maximum of 32 common E-DCH resources may be included in this list. For each defined common E-DCH resource, the following IEs are defined:

>>>Soffset

This IE is a MP IE which value ranges between 0 and 9. This value indicates the concrete slot within the F-DPCH in which the power control commands are included for a concrete F-DPCH code.

Instead of being MP, this IE in various embodiments is set as MD. If the IE is not present, "Soffset" takes a default value. The default value is a function of the position of the common E-DCH resource within the list, a function the "Soffset" value of a previous common E-DCH resource instance, or a function of the position of the common E-DCH resource and the "Soffset" value of a previous common E-DCH resource instance. The first defined common E-DCH resource would occupy position 0 (or 1). The second defined common E-DCH resource would occupy position 1 (or 2). Similar reasoning would apply with the other defined resources.

A concrete realization would be, for instance, if the "Soffset" value for the first instance of the common E-DCH resource takes a default value and the rest of the common E-DCH resources take a value related to the last instance.

For example, a simple formula is presented below to set default values for each defined common E-DCH resource.

Soffset=(offset+common E-DCH resource list position)mod 10 where "offset" is the value of the last instance of the IE "Soffset". If the IE "Soffset" was not present in the first instance, "offset" is equal to zero.

"common E-DCH resource list position" indicates the Common E-DCH resource Configuration Information number by order of appearance. The value of the "common E-DCH resource list position" may be zero (or one) for the first instance.

If the IE is present, the signaled value overwrites the default value.

In some embodiments the position of the second available resource in the ordered list is defined by a default value in the Soffset information element, which default value is a function of the position of the second available resource within the ordered list, a function of a "Soffset" value of a previous first available resource, or a function of the position of the second available resource and an offset value. The offset value is a Soffset value of the first available resource.

>>>F-DPCH Code Number

This IE indicates the code to be used for the F-DPCH.

Instead of being MP, this IE is optional, conditional on value.

If the coding presented for the Soffset is applied, potentially, only three instances of the F-DPCH code number are needed, once for each 10 common E-DCH resources. Hence, in the best configuration, only three instances would need to be present.

Therefore, this IE is in various embodiments set as conditional on value (CV) so that this IE is mandatory present for the first occurrence. Alternatively, it should be mandatory present for the first occurrence or if the default value is equal to zero. Otherwise, this IE is optional. In addition, if this IE is not present, the value is equal to the last occurrence of this IE.

If the IE is present, the signaled value overwrites the default value.

Thus, in some embodiments the F-DPCH code number information element may be the same for a maximum number of ten common E-DCH resources.

>>>>E-HICH Info

E-HICH info contains two additional IEs. Changes in this IE would imply impacts in Release 6 and Release 7 of the 3GPP standards. In order to avoid impacts in earlier versions, a new IE may be used instead: "E-HICH info for common E-DCH". Only two IEs would be needed as this feature only applies to FDD. In some embodiments the E-HICH info for common E-DCH information element is defined by a channelization code and a signature sequence. A default value of the signature sequence may be a function of the position of the second available resource within the ordered list, a function of a "Signature Sequence" value of a previous first available resource, or a function of the position of the second available resource and the "Signature Sequence" value of a previous first available resource.

>>>E-HICH Info for Common E-DCH

Channelization Code

This IE may be set as a conditional on value (CV) IE so that the IE is mandatory only for the first instance and optional for the rest of them. If this IE is not present, the value is equal to the last occurrence of this IE. Thus, in some embodiments the channelization code of the second available resource may be equal to a channelization code of the first available resource.

If the IE is present, the signaled value overwrites the default value.

Signature Sequence

The value of this IE is a number between 0 and 39. This IE in various embodiments is set as MD. If the IE is not present, "Signature sequence" takes a default value.

The default value is a function of the position of the common E-DCH resource within the list, a function the "Signature Sequence" value of a previous common E-DCH resource instance, or a function of the position of the common E-DCH resource and the "Signature Sequence" value of a previous common E-DCH resource instance. The first defined common E-DCH resource would occupy position 0 (or 1). The second defined common E-DCH resource would occupy position 1 (or 2). Similar reasoning would apply with the other defined resources.

A concrete realization may be, for instance, if the "Signature sequence" for the first instance of the common E-DCH resource would take a default value and the rest of the common E-DCH resources would take a value function of the last instance of the IE.

For example, a simple formula is presented below to set default values for each defined common E-DCH resource in which the IE is not present.

$$\text{Signature Sequence} = (\text{offset} + \text{common E-DCH resource list position}) \bmod 40$$

where "offset" is the value of the last occurrence of the IE "Signature Sequence". If "Signature Sequence" was not present in the first instance, "offset" is equal to zero.

"common E-DCH resource list position" indicates the Common E-DCH resource Configuration Information number by order of appearance. The value of the "common E-DCH resource list position" is zero (or one) for the first instance.

If the IE is present, the signaled value overwrites the default value.

>>>Uplink DPCH Code Info for Common E-DCH

Scrambling Code Number

Scrambling code number is a MP present value. This IE takes a relative large number of bits for each common E-DCH resource. This IE in some embodiments is changed to conditional on value (CV) instead, avoiding including such a large number of bits per configured common E-DCH resource.

Conditional on value would mean that this IE is mandatory present for the first occurrence. Otherwise, this IE is optional. In addition, if this IE is not present, the value is of the IE is a function of the last instance. For instance, it may be a function of the position of the common E-DCH resource within the list of common E-DCH resources, a function the "Uplink DPCH code info for Common E-DCH" value of a previous common E-DCH resource instance, or a function of the position of the common E-DCH resource and the "Uplink DPCH code info for Common E-DCH" value of a previous common E-DCH resource instance.

The following formula illustrates how the default values may be set if the IE is not included:

$$\text{Scrambling code number} = \text{offset} + \text{common E-DCH resource list position}$$

where "offset" is the value of the last occurrence of the IE "Scrambling code number". If "offset" was not present in the first instance or occurrence, "offset" is equal to zero.

"common E-DCH resource list position" indicates the Common E-DCH resource Configuration Information number by order of appearance. The value of the "common E-DCH resource list position" is zero (or 1) for the first instance.

If the IE is present, the signaled value overwrites the default value.

Thus, in some embodiments the second available resource is defined by a value in an information element of a scrambling code of an uplink Dedicated Physical Control Channel. The value may be a function of the position of the second available resource within the ordered list of common E-DCH resources, a function of a value in an information element of a scrambling code of an uplink Dedicated Physical Control Channel of a previous first available resource or a function of the position of the second available resource and an "Uplink DPCH code info for Common E-DCH" value in the information element of a scrambling code of an uplink Dedicated Physical Control Channel of the previous first available resource.

>>E-DPDCH Info

E-DCH Minimum Set E-TFCI

This IE is mandatory default. If this IE is missing, it means that there is no minimum E-TFCI set.

In the case of E-DCH in CELL_FACH and Idle Mode, the UE shall always send its message, especially CCCH messages. Otherwise, the UE will be blocked and, potentially, the UE will be dropped. It feels obvious that for E-DCH in CELL_FACH and Idle Mode, the E-DCH minimum set E-TFCI will be always included and it necessary must be a number above zero (E-TFCI index 0 would only let the UE to send the Scheduling Information).

Therefore, the semantic description may be modified so that for CELL_FACH and Idle Mode (or for Enhanced Uplink in CELL_FACH and Idle Mode), if the IE is not included, the E-DCH minimum set E-TFCI is set to a defined value. The only restriction for this value is that the value belongs to the set of values defined in E-TFCI table. The concrete table to be used is indicated in the IE "E-TFCI table index" included also in the IE "E-DPDCH info". As mentioned before, E-TFCI value zero only lets the UE to transmit the Scheduling Information. Therefore, the minimum reasonable E-TFCI value so that the UE can transmit user or higher layers control data is the E-TFCI value 1.

If the IE is present, the signaled values overwrite the default value.

Applying the encoding suggested before, the structure of the IE "PRACH preamble control parameters for Enhanced Uplink" and other IEs involved would result in shown below. Affected IEs are underlined and non-affected IEs are defined in reference to 3GPP Technical Specification (TS) 25.331 section 10 version 10.0.0:

Common E-DCH System Info

| Information Element/Group name | Need | Multi | Type and reference | Semantics description | Version |
|---|---|---|---|---|---|
| UL interference for common E-DCH | OP | | UL interference 10.3.6.87 | | REL-8 |
| Common E-DCH MAC-d flows | MP | | Common E-DCH MAC-d flows 10.3.5.3b | | REL-8 |

-continued

| | | | | |
|---|---|---|---|---|
| CHOICE mode | MP | | | REL-8 |
| >FDD | | | | REL-8 |
| >>PRACH preamble control parameters (for Enhanced Uplink) | MP | PRACH preamble control parameters (for Enhanced Uplink) 10.3.6.54a | Control parameters of the physical signal. | REL-8 |
| >>Initial Serving grant value | MP | Integer (0 . . . 37) | (0 . . . 37) indicates E-DCH serving grant index as defined in [15]. | REL-8 |
| >>E-DCH Transmission Time Interval | MP | Integer(2, 10) | Unit is ms. | REL-8 |
| >>E-AGCH Info | MP | E-AGCH Info 10.3.6.100 | | REL-8 |
| >>HARQ info for E-DCH | MP | HARQ info for E-DCH 10.3.5.7d | | REL-8 |
| >>Uplink DPCH power control info | MP | Uplink DPCH power control info for Common E-DCH 10.3.6.91a | | REL-8 |
| >>E-DPCCH info | MP | E-DPCCH Info 10.3.6.98 | | REL-8 |
| >>E-DPDCH info | MP | E-DPDCH info 10.3.6.99 | | REL-8 |
| >>F-DPCH TPC command error rate target | MP | Real (0.01 . . . 0.1 by step of 0.01). | Downlink F-DPCH information. The actual value of dl-FDPCH-TPCcommandErrorRate = IE value * 0.01 | REL-8 |
| >>Additional E-DCH transmission back off | MP | Integer (0 . . . 15) | In terms of TTIs. | REL-8 |
| >>Maximum E-DCH resource allocation for CCCH | MP | Enumerated (8, 12, 16, 24, 32, 40, 80, 120) | In terms of TTIs. | REL-8 |
| >>Maximum period for collision resolution phase | MP | Integer (8 . . . 24) | In terms of TTIs. | REL-8 |
| >>E-DCH transmission continuation back off | MP | Enumerated (0, 8, 16, 24, 40, 80, 120, infinity) | In terms of TTIs. If set to "infinity", implicit common E-DCH resource release is disabled. | REL-8 |
| >>ACK/NACK support on HS-DPCCH | MP | Boolean | TRUE indicates that HS-DPCCH shall be used when a common E-DCH resource is allocated to the UE for DTCH/DCCH transmission after collision resolution. FALSE indicates that HS-DPCCH shall not be used | REL-8 |
| >>Measurement Feedback Info | OP | Measurement Feedback Info 10.3.6.40a | | REL-8 |
| >>Common E-DCH Resource Configuration information list | MP | 1 to <maxEDCHs> | | REL-8 |
| >>>Soffset | MD | Integer(0 . . . 9) | (0 . . . 9) indicates symbol offset as defined in [26] Note3 | REL-8 |
| >>>F-DPCH Code number | CV-Short | Integer (0 . . . 255) | If this IE is not present, the value is equal to the last occurrence of this IE. | REL-8 |

-continued

| | | | | |
|---|---|---|---|---|
| >>>E-RGCH Information | OP | E-RGCH Info 10.3.6.102 | | REL-8 |
| >>>E-HICH info for common E-DCH | MP | E-HICH info for common E-DCH 10.3.6.1xx | | REL-8 |
| >>>Uplink DPCH code info | MP | Uplink DPCH code info for Common E-DCH 10.3.6.87b | | REL-8 |
| >TDD | | | | REL-8 |
| >>CHOICE TDD option | MP | | | REL-8 |
| >>>7.68 Mcps TDD | | NULL | | REL-8 |
| >>>3.84 Mcps TDD | | NULL | | REL-8 |
| >>>1.28 Mcps TDD | | | | REL-8 |
| >>>>E-RUCCH Info | MP | E-RUCCH Info 1.28 Mcps TDD 10.3.6.103a | | REL-8 |
| >>>>E-PUCH info | MP | E-PUCH Info 1.28 Mcps TDD 10.3.6.104a | Note1 | REL-8 |
| >>>>E-HICH info | MP | E-HICH info 1.28 Mcps TDD 10.3.6.101a | Note1 | REL-8 |
| >>>>E-AGCH Info | MP | E-AGCH Info 1.28 Mcps TDD 10.3.6.100a | Note1 | REL-8 |
| >>>>HARQ info for E-DCH | MP | HARQ info for E-DCH 10.3.5.7d | | REL-8 |
| >>>>CCCH transmission info | MP | | Note2 | REL-8 |
| >>>>>Common E-RNTI info | MP | Common E-RNTI info 10.3.3.7a | | REL-8 |
| >>>>>HARQ maximum number of retransmissions | MP | Integer (0 . . . 7) | | REL-8 |
| >>>>>HARQ retransmission timer | MP | Enumerated (10, 15, 20, 25, 30, 35, 40, 45, 50, 55, 60, 65, 70, 75, 80, 85, 90, 95, 100, 110, 120, 140, 160) | Unit: ms | REL-8 |
| >>>>>HARQ power offset | MP | Integer(0 . . . 6) | | REL-8 |

| Condition | Explanation |
|---|---|
| Short | This IE is mandatory present for the first occurrence. Otherwise, this IE is optional. |

NOTE1:
These IEs correspond to the HS-DSCH configuration for CELL_FACH, CELL_PCH and URA_PCH state on primary frequency, the configuration on secondary frequency is signalled to UE via dedicated signalling.
NOTE2:
These IEs correspond to CCCH transmission configuration for CELL_FACH state on the primary frequency and secondary frequency.
NOTE3:
The default value is defined by:
Soffset = (offset_common E-DCH resource list position) mod 10
where "offset" is the value of the last instance of the IE "Soffset". If the IE "Soffset" was not present in the first instance, "offset" is equal to zero.
"common E-DCH resource list position" indicates the Common E-DCH resource Configuration Information number by order of appearance. The value of the "common E-DCH resource list position" is zero for the first instance.

PRACH Preamble Control Parameters (for Enhanced Uplink)

| Information Element/Group name | Need | Multi | Type and reference | Semantics description | Version |
|---|---|---|---|---|---|
| Available Signature | MD | | Bit string(16) | The default value is the inverse bit string indicated in theIE "Available Signature" in the IE "PRACH Info (for RACH)". Each bit indicates availability for a signature. Each available signature on the AICH is associated with one CommonE-DCH Resource Configuration in the "Common E-DCH resource configuration information list". | REL-8 |
| E-AI Indication | MP | | BOOLEAN | TRUE: E-AIs are in use on the AICH. FALSE: E-AIs are not in use on the AICH. | REL-8 |
| Preamble scrambling code number | MD | | Integer (0...15) | The default value is the value indicated in the IE "Preamble scrambling code number"in the IE "PRACH Info (for RACH)". Identification of scrambling code, see [28] | REL-8 |
| Available Sub Channel Number | MD | | Bit string(12) | The default value is the same value indicated in theIE "Available Signatures" in the IE "PRACH system information list". Each bit indicates availability for a subchannel, where the subchannels are numbered "subchannel 0"to "subchannel 11". The value 1 of abit indicates that the corresponding subchannel is available and the value 0 indicates that it is not available. | REL-8 |
| PRACH partitioning | MD | | PRACH partitioning 10.3.6.53 | Default value is the value of "PRACH partitioning" in the first occurrence in list "PRACH system information list" in SIB5 or SIB5bis. | REL-8 |
| Persistence scaling factors | OP | | Persistence scaling factors 10.3.6.48 | This IE shall not be present if only ASC 0 and ASC 1 are defined. If this IE is absent, default value is the value of "Persistence scaling factors" in the first occurrence in list "PRACH system information list" in SIB5 or SIB5bis, if value exists | REL-8 |

-continued

| Information Element/Group name | Need | Multi | Type and reference | Semantics description | Version |
|---|---|---|---|---|---|
| AC-to-ASC mapping | MD | | AC-to-ASC mapping 10.3.6.1 | Default value is the value of "AC-to-ASC mapping" in the first occurrence in list "PRACH system information list" in SIB5 or SIB5bis. | REL-8 |
| Primary CPICH TX power | MD | | Primary CPICH TX power 10.3.6.61 | Default value is the value of "Primary CPICH TX power" in the first occurrence in list "PRACH system information list" in SIB5 or SIB5bis. | REL-8 |
| Constant value | MD | | Constant value 10.3.6.11 | Default value is the value of "Constant value" in the first occurrence in list "PRACH system information list" in SIB5 or SIB5bis. | REL-8 |
| PRACH power offset | MD | | PRACH power offset 10.3.6.54 | Default value is the value of "PRACH power offset" in the first occurrence in list "PRACH system information list" in SIB5 or SIB5bis | REL-8 |
| PRACH transmission parameters | MD | | RACH transmission parameters 10.3.6.67 | Default value is the value of "RACH transmission parameters" in the first occurrence in list "PRACH system information list" in SIB5 or SIB5bis. | REL-8 |
| AICH info | MD | | AICH info 10.3.6.2 | Default value is the value of "AICH info" in the first occurrence in list "PRACH system information list" in SIB5 or SIB5bis. | REL-8 |
| Power offset Pp-e | MP | | Integer(−5 . . . 10) | In dB. Power offset between the last transmitted preamble and the initial DPCCH transmission as defined in [26] | REL-8 |

E-DPDCH Info

| Information Element/Group name | Need | Multi | Type and reference | Semantics description | Version |
|---|---|---|---|---|---|
| E-TFCI table index | MP | | Integer (0 . . . 1) | Indicates which standardised E-TFCI TB size table shall be used. See Note 3. | REL-6 |
| E-DCH minimum set E-TFCI | MD | | Integer (0 . . . 127) | See [15]: Absence means no E-DCH minimum set. In CELL FACH and Idle Mode, the default value is 1. | REL-6 |
| Reference E-TFCIs | MP | 1 to 8 | | See [29] | REL-6 |
| >Reference E-TFCI | MP | | Integer (0 . . . 127) | | REL-6 |

-continued

| Information Element/Group name | Need | Multi | Type and reference | Semantics description | Version |
|---|---|---|---|---|---|
| >Reference E-TFCI PO | MP | | Integer (0 . . . 29, | Refer to quantization of the power offset in [28] | REL-6 |
| | | | 30, 31) | Values 30 and 31 are only used for E-TFCI > ETFCI Boost | REL-7 |
| Minimum reduced E-DPDCH gain factor | OP | | Enumerated (8/15, 11/15, 15/15, 21/15, 30/15, 42/15, 60/15, 84/15) | $\beta_{ed, k, reduced, min}$ [29]; the default value is 8/15. If the configurable reduced E-DPDCH gain factor is not supported by the UE, the default value is used. | REL-8 |
| Maximum channelisation codes | MP | | Enumerated (sf256, sf128, sf64, sf32, sf16, sf8, sf4, 2sf4, 2sf2, 2sf2and2sf4) | | REL-6 |
| $PL_{non-max}$ | MP | | Real (0.44 . . . 1.0 by step of 0.04) | As defined in [27] | REL-6 |
| Scheduling Information Configuration | MP | | | | REL-6 |
| >Periodicity for Scheduling Info - no grant | MD | | Enumerated (everyEDCHTTI, 4, 10, 20, 50, 100, 200, 500, 1000) | Values in ms. Default value is "no report" NOTE 1. | REL-6 |
| >Periodicity for Scheduling Info - grant | MD | | Enumerated (everyEDCHTTI, 4, 10, 20, 50, 100, 200, 500, 1000) | Values in ms. Default value is "no report" NOTE 1. | REL-6 |
| >Power Offset for Scheduling Info | MP | | Integer (0 . . . 6) | Only used when no MACd PDUs are included in the same MACe PDU. Unit is in dB. | REL-6 |
| 3-Index-Step Threshold | MD | | Integer (0 . . . 37) | Refers to an index in the "SG-Table" (see [15]). Default value is 0. NOTES 2, 3. | REL-6 |
| 2-Index-Step Threshold | MD | | Integer (0 . . . 37) | Refers to an index in the "SG-Table" (see [15]). Default value is 0. NOTES 2, 3. | REL-6 |

NOTE 1:
If the Periodicity is set to 4 ms and the E-DCH TTI is set to 10 ms, the UE shall interpret the periodicity value as 10 ms.
NOTE 2:
If the 3-index-Step Threshold value is greater than 2-index-Step Threshold, the UE behaviour is unspecified.
NOTE 3:
If the UE is operating in 16QAM mode, the value of "E-TFCI table index" is increased by 2, and indices in the SG-Table refer to Scheduling Grant Table 2 in [15].

E-HICH Info for Common E-DCH

| Information Element/Group name | Need | Multi | Type and reference | Semantics description | Version |
|---|---|---|---|---|---|
| Channelisation Code | CV-Short | | Integer (0 . . . 127) | If this IE is not present, the value is equal to the last occurrence of this IE. | REL-8 |
| Signature Sequence | MD | | Integer (0 . . . 39) | Note1 | REL-8 |
| Condition | | | Explanation | | |
| Short | | | This IE is mandatory present for the first occurrence. Otherwise, this IE is optional. | | |

NOTE1:
The default value is defined by: Signature Sequence = (offset + common E-DCH resource list position) mod 40 where "offset" is the value of the last occurrence of the IE "Signature Sequence". If "Signature Sequence" was not present in the first occurrence, "offset" is equal to zero. "common E-DCH resource list position" indicates the Common E-DCH resource Configuration Information number by order of appearance. The value of the "common E-DCH resource list position" is zero for the first instance.

Uplink DPCH Code Info for Common E-DCH

| Information Element/Group name | Need | Multi | Type and reference | Semantics description | Version |
|---|---|---|---|---|---|
| Scrambling code type | MP | | Enumerated(short, long) | | REL-8 |
| Scrambling code number | CV-Short | | Integer(0 . . . 16777215) | Note1 | REL-8 |
| Condition | | | Explanation | | |
| Short | | | This IE is mandatory present for the first occurrence. Otherwise, this IE is optional. | | |

NOTE1:
If this IE is not included, the value is given by: Scrambling code number = offset + common E-DCH resource list position where "offset" is the value of the last occurrence of the IE "scrambling code number". If the IE "scrambling code number" is not present in the first occurrence, "offset" is equal to zero. "common E-DCH resource list position" indicates the Common E-DCH resource Configuration Information number by order of appearance. The value of the "common E-DCH resource list position" is zero for the first instance.

The ASN.1 code would need to be updated as it follows (only relevant IEs have been added):

```
SysInfoType5 ::=                        SEQUENCE {
        sib6indicator                   BOOLEAN,
    -- Physical channel IEs
        pich-PowerOffset                PICH-PowerOffset,
        modeSpecificInfo                CHOICE {
            fdd                         SEQUENCE {
                aich-PowerOffset        AICH-PowerOffset
            },
            tdd                         SEQUENCE {
    -- If PDSCH/PUSCH is configured for 1.28Mcps or 7.68Mcps TDD, the following IEs should be absent
    -- and the info included in the respective tdd128SpecificInfo or tdd768SpecificInfo instead.
    -- If PDSCH/PUSCH is configured for 3.84Mcps TDD in R5, HCR-r5-SpecificInfo should also be
    -- included.
                pusch-SysInfoList-SFN           PUSCH-SysInfoList-SFN           OPTIONAL,
                pdsch-SysInfoList-SFN           PDSCH-SysInfoList-SFN           OPTIONAL,
                openLoopPowerControl-TDD        OpenLoopPowerControl-TDD
            }
        },
        primaryCCPCH-Info               PrimaryCCPCH-Info               OPTIONAL,
        prach-SystemInformationList     PRACH-SystemInformationList,
        sCCPCH-SystemInformationList    SCCPCH-SystemInformationList,
    -- cbs-DRX-Level1Information is conditional on any of the CTCH indicator IEs in
    -- sCCPCH-SystemInformationList
        cbs-DRX-Level1Information       CBS-DRX-Level1Information       OPTIONAL,
    -- Extension mechanism for non- release99 information
        v4b0NonCriticalExtensions       SEQUENCE {
            sysInfoType5-v4b0ext        SysInfoType5-v4b0ext-IEs        OPTIONAL,
    -- Extension mechanism for non- rel-4 information
            v590NonCriticalExtensions   SEQUENCE {
```

```
            sysInfoType5-v590ext              SysInfoType5-v590ext-IEs        OPTIONAL,
        v650NonCriticalExtensions             SEQUENCE {
            sysInfoType5-v650ext              SysInfoType5-v650ext-IEs        OPTIONAL,
        v680NonCriticalExtensions             SEQUENCE {
            sysInfoType5-v680ext              SysInfoType5-v680ext-IEs
OPTIONAL,
        v690NonCriticalExtensions             SEQUENCE {
            sysInfoType5-v690ext              SysInfoType5-v690ext-IEs,
        v770NonCriticalExtensions             SEQUENCE {
            sysInfoType5-v770ext              SysInfoType5-v770ext-IEs,
        v860NonCriticalExtensions             SEQUENCE {
            sysInfoType5-v860ext              SysInfoType5-v860ext-IEs,
        v890NonCriticalExtensions             SEQUENCE {
            sysInfoType5-v890ext              SysInfoType5-v890ext-
IEs,
        v8b0NonCriticalExtensions             SEQUENCE {
            sysInfoType5-v8b0ext
                                              SysInfoType5-v8b0ext-
IEs,
        v8c0NonCriticalExtensions             SEQUENCE {
            sysInfoType5-v8c0ext
                            nonCriticalExtensions                   SEQUENCE { }
OPTIONAL
                        }                     OPTIONAL
                    }                         OPTIONAL
                }                             OPTIONAL
            }                                 OPTIONAL
        }                                     OPTIONAL
    }                                         OPTIONAL
}                                             OPTIONAL
        }                                     OPTIONAL
    }                                         OPTIONAL
}
SysInfoType5-v890ext-IEs ::= SEQUENCE {
    secondFrequencyInfo              FrequencyInfoTDD                        OPTIONAL,
    -- The field 'dummy' shall be marked absent in SysInfoType5 and SysInfoType5bis. A failure
to
    -- comply with this requirement may prevent the UE to receive any service in the cell. The
UE
    -- may treat the cell as barred.
    dummy                    SEQUENCE { }    OPTIONAL
}
SysInfoType5-v8c0ext-IEs ::= SEQUENCE {
    commonEDCHSystemInfo             CommonEDCHSystemInfo           OPTIONAL
}
PRACH-PreambleForEnhancedUplink ::=     SEQUENCE {
    availableSignatures                 AvailableSignatures                 OPTIONAL,
    e-ai-Indication                     BOOLEAN,
    preambleScramblingCodeWordNumber    PreambleScramblingCodeWordNumber    OPTIONAL,
    availableSubChannelNumbers          AvailableSubChannelNumbers          OPTIONAL,
    prach-Partitioning                  PRACH-Partitioning-r7               OPTIONAL,
    persistenceScalingFactorList        PersistenceScalingFactorList        OPTIONAL,
    ac-To-ASC-MappingTable              AC-To-ASC-MappingTable              OPTIONAL,
    primaryCPICH-TX-Power               PrimaryCPICH-TX-Power               OPTIONAL,
    constantValue                       ConstantValue                       OPTIONAL,
    prach-PowerOffset                   PRACH-PowerOffset                   OPTIONAL,
    rach-TransmissionParameters         RACH-TransmissionParameters         OPTIONAL,
    aich-Info                           AICH-Info                           OPTIONAL,
    powerOffsetPp-e                     INTEGER (–5..10)
}
Common-E-DCH-ResourceInfoList ::=   SEQUENCE {
    s-offset                            INTEGER (0..9)                      OPTIONAL,
    f-dpch-ChannelisationCodeNumber     INTEGER (0..255)                    OPTIONAL,
    e-RGCH-Information                  E-RGCH-Information                  OPTIONAL,
    e-hich-Info                         E-HICH-Information-CommonEdch,
    ul-DPCH-CodeInfoForCommonEDCH       UL-DPCH-CodeInfoForCommonEDCH
}
UL-DPCH-CodeInfoForCommonEDCH ::=   SEQUENCE {
    ul-DPCCHscramblingCodeType          ScramblingCodeType,
    ul-DPCCHscramblingCode              UL-ScramblingCode                   OPTIONAL
}
E-HICH-Information-CommonEdch ::=   SEQUENCE {
    channelisationCode                  E-HICH-ChannelisationCode           OPTIONAL,
    signatureSequence                   E-HICH-RGCH-SignatureSequence       OPTIONAL
}
```

In some embodiments, a second approach may be taken to provide a backward compatible solution.

In this case a new IE needs to be added in SIB5, "Common E-DCH System Info Short", for instance. This IE would contain the new encoding.

The tabular of SIB5 would be as follows:

System Information Block Type 5 and 5Bis

| Information Element/Group name | Need | Multi | Type and reference | Semantics description | Version |
|---|---|---|---|---|---|
| SIB6 Indicator | MP | | Boolean | TRUE indicates that SIB6 is broadcast in the cell. When the UE receives SIB5 in the System Information Container message, this IE is interpreted as FALSE | |
| PhyCH information elements | | | | | |
| PICH Power offset | MP | | PICH Power offset 10.3.6.50 | If the cell is operating in MBSFN mode as indicated in subclause 8.1.1.6.3 the UE behaves as if this IE would not have been received. | |
| CHOICE mode | MP | | | | |
| >FDD | | | | | |
| >>AICH Power offset | MP | | AICH Power offset 10.3.6.3 | If the cell is operating in MBSFN mode as indicated in subclause 8.1.1.6.3 the UE behaves as if this IE would not have been received. | |
| >TDD | | | | | |
| >>PUSCH system information | OP | | PUSCH system information 10.3.6.66 | If the cell is operating in MBSFN mode as indicated in subclause 8.1.1.6.3 the UE behaviour upon reception of this IE is unspecified. | |
| >>PUSCH system information VHCR | OP | | PUSCH system information VHCR 10.3.6.66a | Only for 7.68 Mcps TDD If the cell is operating in MBSFN mode as indicated in subclause 8.1.1.6.3 the UE behaviour upon reception of this IE is unspecified. | REL-7 |
| >>PDSCH system information | OP | | PDSCH system information 10.3.6.46 | If the cell is operating in MBSFN mode as indicated in subclause 8.1.1.6.3 the UE behaviour upon reception of this IE is unspecified. | |
| >>TDD open loop power control | MP | | TDD open loop power control 10.3.6.79 | If the cell is operating in MBSFN mode as indicated in subclause 8.1.1.6.3 the UE behaves as if this IE would not have been received. | |
| Primary CCPCH info | OP | | Primary CCPCH info 10.3.6.57 | Note 1 | |
| PRACH system information list | MP | | PRACH system information list 10.3.6.55 | If the cell is operating in MBSFN mode as indicated in subclause 8.1.1.6.3 the UE behaves as if this IE would not have been received. | |

-continued

| Information Element/Group name | Need | Multi | Type and reference | Semantics description | Version |
|---|---|---|---|---|---|
| Common E-DCH system info | OP | | Common E-DCH system info 10.3.6.9a | | REL-8 |
| Common E-DCH system info short | OP | | Common E-DCH system info short 10.3.6.9b | | REL-8 |
| Secondary CCPCH system information | MP | | Secondary CCPCH system information 10.3.6.72 | Note 2 If the cell is operating in MBSFN mode as indicated in subclause 8.1.1.6.3 the UE behaves as if this IE would not have been received. | |
| CBS DRX Level 1 information | CV-CTCH | | CBS DRX Level 1 information 10.3.8.3 | | |
| Frequency band indicator | OP | | Frequency band indicator 10.3.6.35b | | REL-6 |
| Frequency band indicator 2 | OP | | Frequency band indicator 2 10.3.6.35c | | REL-6 |
| HSDPA cell Indicator | MD | | Enumerated (HSDPA Capable Cell) | Default is 'HSDPA capability not indicated'. 'HSDPA Capable Cell' means that the UE may consider this cell as part of the HSDPA coverage area for display indication only. This indication shall not be used for any other purpose. If the cell is operating in MBSFN mode as indicated in subclause 8.1.1.6.3 the UE behaves as if this IE would not have been received. | REL-6 |
| E-DCH cell Indicator | MD | | Enumerated (E-DCH Capable Cell) | Default is 'E-DCH capability not indicated'. 'E-DCH Capable Cell' means that the UE may consider this cell as part of the E-DCH coverage area for display indication only. This indication shall not be used for any other purpose. If the cell is operating in MBSFN mode as indicated in subclause 8.1.1.6.3 the UE behaves as if this IE would not have been received. | REL-6 |
| Secondary CCPCH system information MBMS | OP | | Secondary CCPCH system information MBMS 10.3.6.72a | Included if MCCH is on an S-CCPCH used only for MBMS. Note 2 | REL-6 |

-continued

| Information Element/Group name | Need | Multi | Type and reference | Semantics description | Version |
|---|---|---|---|---|---|
| CHOICE mode | OP | | | | REL-7 |
| >FDD | | | | | REL-7 |
| >>HS-DSCH common system information | MP | | HS-DSCH common system information 10.3.6.36c | Included if cell supports HS-DSCH reception in CELL_FACH and during IDLE to RRC Connection state transition. | REL-7 |
| >>HS-DSCH paging system information | OP | | HS-DSCH paging system information 10.3.6.36d | Included if cell supports for UEs in RRC Connected state paging message reception on HS-DSCH. | REL-7 |
| >TDD | | | | | REL-7 |
| >>HS-DSCH common system information | MP | | HS-DSCH common system information 1.28 Mcps TDD 10.3.6.36ca | Included if cell supports HS-DSCH reception in CELL_FACH and during IDLE to RRC Connection state transition. | REL-8 |
| >>HS-DSCH paging system information | OP | | HS-DSCH paging system information 1.28 Mcps TDD 10.3.6.36da | Included if cell supports for UEs in RRC Connected state paging message reception on HS-DSCH. | REL-8 |
| TDD MBSFN information | OP | | TDD MBSFN Information 10.3.6.78b | TDD only: included only if some timeslots are designated to MBSFN. | REL-7 |
| HS-DSCH DRX in CELL_FACH Information | OP | | HS-DSCH DRX in CELL_FACH Information 10.3.6.36g | | REL-8 |
| HS-DSCH DRX in CELL_FACH Information 1.28 Mcps TDD | OP | | HS-DSCH DRX in CELL_FACH Information 1.28 Mcps TDD 10.3.6.36h | | REL-8 |
| Second Frequency info | OP | | Integer (0 ... 16383) | Note 3 | REL-8 |
| Treset Usage Indicator | OP | | Enumerated (TRUE) | Only for 1.28 Mcps TDD. The presence of this IE means the timer Treset is not valid when the dedicated H-RNTI is configured in CELL_FACH and CELL_PCH. | REL-8 |
| UpPCH Position Info | CV-Frequency | | Integer (0 ... 127) | Only for 1.28 Mcps TDD. | REL-8 |

The new IE would be defined as follows:
Common E-DCH System Info Short
  NOTE: Only for FDD.

| Information Element/Group name | Need | Multi | Type and reference | Semantics description | Version |
|---|---|---|---|---|---|
| UL interference for common E-DCH | CV-Optional | | UL interference 10.3.6.87 | | REL-8 |
| Common E-DCH MAC-d flows | CV-Mandatory | | Common E-DCH MAC-d flows 10.3.5.3b | | REL-8 |

-continued

| | | | | |
|---|---|---|---|---|
| PRACH preamble control parameters (for Enhanced Uplink) | CV-Mandatory | PRACH preamble control parameters (for Enhanced Uplink) 10.3.6.54a | Control parameters of the physical signal. | REL-8 |
| Initial Serving grant value | CV-Mandatory | Integer (0 . . . 37) | (0 . . . 37) indicates E-DCH serving grant index as defined in [15]. | REL-8 |
| E-DCH Transmission Time Interval | CV-Mandatory | Integer(2, 10) | Unit is ms. | REL-8 |
| E-AGCH Info | CV-Mandatory | E-AGCH Info 10.3.6.100 | | REL-8 |
| HARQ info for E-DCH | CV-Mandatory | HARQ info for E-DCH 10.3.5.7d | | REL-8 |
| Uplink DPCH power control info | CV-Mandatory | Uplink DPCH power control info for Common E-DCH 10.3.6.91a | | REL-8 |
| E-DPCCH info | CV-Mandatory | E-DPCCH Info 10.3.6.98 | | REL-8 |
| E-DPDCH info | CV-Mandatory | E-DPDCH info 10.3.6.99 | | REL-8 |
| F-DPCH TPC command error rate target | CV-Mandatory | Real (0.01 . . . 0.1 by step of 0.01). | Downlink F-DPCH information. The actual value of dl-FDPCH-TPCcommandErrorRate = IE value * 0.01 | REL-8 |
| Additional E-DCH transmission back off | CV-Mandatory | Integer (0 . . . 15) | In terms of TTIs. | REL-8 |
| Maximum E-DCH resource allocation for CCCH | CV-Mandatory | Enumerated (8, 12, 16, 20, 24, 32, 40, 80) | In terms of TTIs. | REL-8 |
| Maximum period for collision resolution phase | CV-Mandatory | Integer (8 . . . 24) | In terms of TTIs. | REL-8 |
| E-DCH transmission continuation back off | CV-Mandatory | Enumerated (0, 4, 8, 16, 24, 40, 80, infinity) | In terms of TTIs. If set to "infinity", implicit common E-DCH resource release is disabled. | REL-8 |
| ACK/NACK support on HS-DPCCH | CV-Mandatory | Boolean | TRUE indicates that HS-DPCCH shall be used when a common E-DCH resource is allocated to the UE for DTCH/DCCH transmission after collision resolution. FALSE indicates that HS-DPCCH shall not be used | REL-8 |
| Measurement Feedback Info | CV-Optional | Measurement Feedback Info 10.3.6.40a | | REL-8 |
| Common E-DCH Resource Configuration information list | MP | 1 to <maxEDCHs> | | REL-8 |
| >Soffset | MD | Integer(0 . . . 9) | (0 . . . 9) indicates symbol offset as defined in [26] Note3 | REL-8 |
| >F-DPCH Code number | CV-Short | Integer (0 . . . 255) | If this IE is not present, the value is equal to the last occurrence of this IE. | REL-8 |
| >E-RGCH Information | CV-Short | E-RGCH Info | | REL-8 |

-continued

| | | | | | |
|---|---|---|---|---|---|
| >E-HICH info for common E-DCH | MD | | 10.3.6.102 E-HICH info for common E-DCH 10.3.6.1xx | | REL-8 |
| >Uplink DPCH code info | MD | | Uplink DPCH code info for Common E-DCH 10.3.6.87b | | REL-8 |

| Condition | Explanation |
|---|---|
| Optional | If the IE "Common E-DCH System Info" is present, the value of the IE is the same value of corresponding IE in the IE "Common E-DCH system info". Otherwise, this IE is optional. |
| Short | This IE is mandatory present for the first occurrence. Otherwise, this IE is optional. |
| Mandatory | If the IE "Common E-DCH System Info" is present, the value of the IE is the same value of the corresponding IE in the IE "Common E-DCH System Info". Otherwise, this IE is mandatory present. |

NOTE1:
These IEs correspond to the HS-DSCH configuration for CELL_FACH, CELL_PCH and URA_PCH state on primary frequency, the configuration on secondary frequency is signalled to UE via dedicated signalling.
NOTE2:
These IEs correspond to CCCH transmission configuration for CELL_FACH state on the primary frequency and secondary frequency.
NOTE3:
The default value is defined by: Soffset = (offset + common E-DCH resource list position) mod 10 where "offset" is the value of the last instance of the IE "Soffset". If the IE "Soffset" was not present in the first instance, "offset" is equal to zero. "common E-DCH resource list position" indicates the Common E-DCH resource Configuration Information number by order of appearance. The value of the "common E-DCH resource list position" is zero for the first instance.

Additional conditions are placed in other to reduce the signalling in case the IE "Common E-DCH System Info" is included. The affected IEs are shown below:

PRACH Preamble Control Parameters (for Enhanced Uplink)

| Information Element/Group name | Need | Multi | Type and reference | Semantics description | Version |
|---|---|---|---|---|---|
| Available Signature | MD | | Bit string(16) | The default value is the inverse bitstring indicated in the IE "Available Signature" in the IE "PRACH Info (for RACH)". Each bit indicates availability for a signature. Each available signature on the AICH is associated with one Common E-DCH Resource Configuration in the "Common E-DCH resource configuration information list". | REL-8 |
| E-AI Indication | MP | | BOOLEAN | TRUE: E-AIs are in use on the AICH. FALSE: E-AIs are not in use on the AICH. | REL-8 |
| Preamble scrambling code number | MD | | Integer (0 . . . 15) | The default value is the value indicated in the IE "Preamble scrambling code number" in the IE "PRACH Info (for RACH)". Identification of scrambling code, see [28] | REL-8 |

-continued

| Information Element/Group name | Need | Multi | Type and reference | Semantics description | Version |
|---|---|---|---|---|---|
| Available Sub Channel Number | MD | | Bit string(12) | The default value is the same value indicated in the IE "Available Signatures" in the IE "PRACH system information list". Each bit indicates availability for a subchannel, where the subchannels are numbered "subchannel 0"to "subchannel 11". The value 1 of abit indicates that the corresponding subchannel is available and the value 0 indicates that it is not available. | REL-8 |
| PRACH partitioning | MD | | PRACH partitioning 10.3.6.53 | Default value is the value of "PRACH partitioning" in the first occurrence in list "PRACH system information list" in SIB5 or SIB5bis. | REL-8 |
| Persistence scaling factors | OP | | Persistence scaling factors 10.3.6.48 | This IE shall not be present if only ASC 0 and ASC 1 are defined. If this IE is absent, default value is the value of "Persistence scaling factors" in the first occurrence in list "PRACH system information list" in SIB5 or SIB5bis, if value exists | REL-8 |
| AC-to-ASC mapping | MD | | AC-to-ASC mapping 10.3.6.1 | Default value is the value of "AC-to-ASC mapping" in the first occurrence in list "PRACH system information list" in SIB5 or SIB5bis. | REL-8 |
| Primary CPICH TX power | MD | | Primary CPICH TX power 10.3.6.61 | Default value is the value of "Primary CPICH TX power" in the first occurrence in list "PRACH system information list" in SIB5 or SIB5bis. | REL-8 |
| Constant value | MD | | Constant value 10.3.6.11 | Default value is the value of "Constant value" in the first occurrence in list "PRACH system information list" in SIB5 or SIB5bis | REL-8 |
| PRACH power offset | MD | | PRACH power offset 10.3.6.54 | Default value is the value of "PRACH power offset" in the first occurrence in list "PRACH system information list" in SIB5 or SIB5bis | REL-8 |
| PRACH transmission parameters | MD | | RACH transmission parameters 10.3.6.67 | Default value is the value of "RACH transmission parameters" in the first occurrence in list "PRACH system | REL-8 |

-continued

| Information Element/Group name | Need | Multi | Type and reference | Semantics description | Version |
|---|---|---|---|---|---|
| AICH info | MD | | AICH info 10.3.6.2 | information list" in SIB5 or SIB5bis. Default value is the value of "AICH info" in the first occurrence in list "PRACH system information list" in SIB5 or SIB5bis. | REL-8 |
| Power offset Pp-e | MP | | Integer(−5 . . . 10) | In dB. Power offset between the last transmitted preamble and the initial DPCCH transmission as defined in [26] | REL-8 |

E-HICH Info Common for E-DCH

| Information Element/Group name | Need | Multi | Type and reference | Semantics description | Version |
|---|---|---|---|---|---|
| Channelisation Code | CV-Short | | Integer (0 . . . 127) | For the first occurrence, if this IE is not present, the value of this IE is the value of last occurrence of the IE "Channelisation Code"present in the IE "Common E-DCH system info". For subsequent occurrences, if the IE is not present, the value is equal to the last occurrence of this IE. | REL-8 |
| Signature Sequence | ME | | Integer (0 . . . 39) | Note1 | REL-8 |
| Short | | | If the IE "Common E-DCH system info" is not present, this IE is mandatory present for the first occurrence. Otherwise, this IE is optional, | | |

NOTE1:
The default value is defined by: Signature Sequence = (offset + common E-DCH resource list position) mod 40 where "offset" is the value of last occurrence of the IE "Signature Sequence". If "Signature Sequence" was not present in the first instance, "offset" is equal to zero. "common E-DCH resource list position" indicates the Common E-DCH resource Configuration Information number by order of appearance. The value of the "common E-DCH resource list position" is zero for the first instance.

The IEs "E-DPCH info" and "Uplink DPCH code info for Common E-DCH" would not change compared with the first solution.

The encoding improvement of each IE present in "Common E-DCH System Info" are independent from other IEs.

Figure 6:
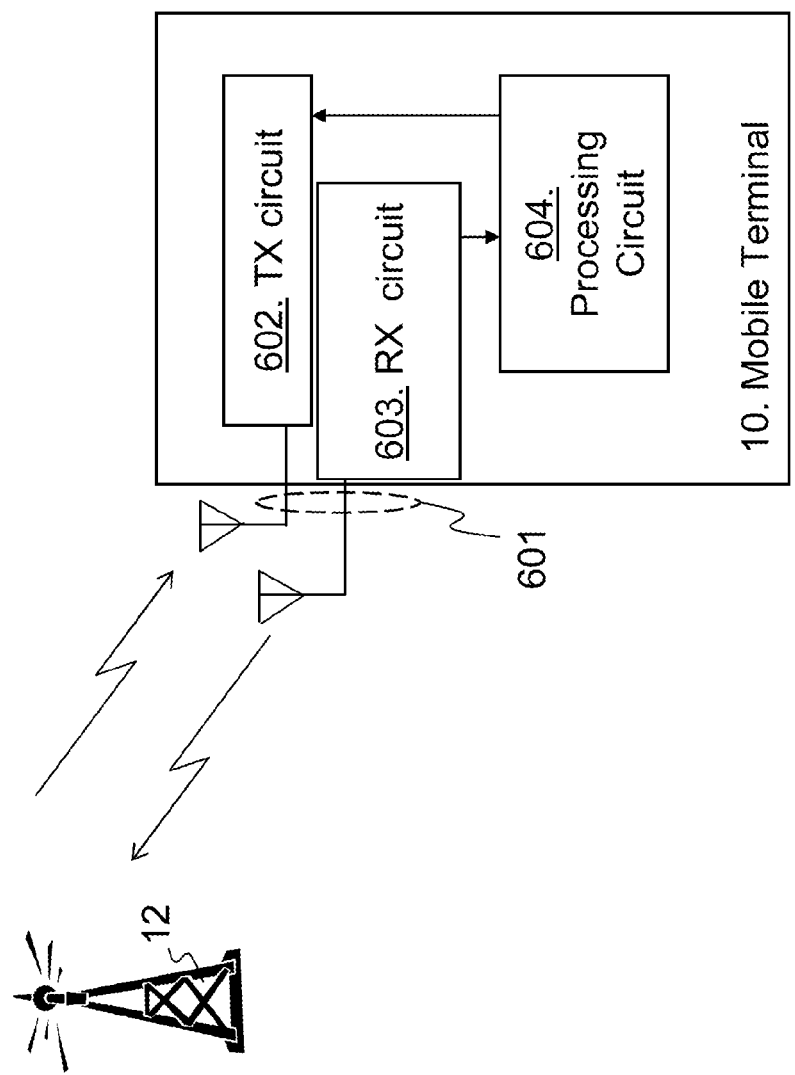
FIG. 6 is a block diagram depicting embodiments of a mobile equipment.

FIG. 6 is a block diagram depicting embodiments of the mobile terminal 10. The mobile terminal 10 may include one or more transmit/receive antennas 601, along with associated transmitter (TX) circuit 602 and receiver (RX) circuit 603, respectively, and includes one or more processing circuits 604. The RX circuit 603 is configured to receive from the base station 12, via the receive antennas 601, broadcasted system information that directly indicates the access request preambles for one channel, e.g., the legacy CB channel such as a RACH. The processing circuit 604 is configured to then derive the access request preambles for the other channel, e.g., the non-legacy CB channel, such as a E-DCH, based on, e.g. as a function of, the directly indicated preambles. In some embodiments, the processing circuit 604 is further configured to randomly select from amongst the derived access request preambles, whereupon the TX circuit 602 is configured to transmit the selected preamble to the base station 12, in order to request access to the associated CB channel.

In some embodiment, the RX circuit 603 of the mobile terminal 10 is configured to receive system information that indicates a first available resource of a CB channel. The processing circuit 604 of the mobile terminal 10 may be configured to then derive information for a second available resource of the CB channel based on, e.g. as a function of, the first available resource. This may entail, for instance, deriving information for the second available resource according to a pre-determined rule that defines the second resource as a function of the first resource, e.g., as a function of the first resource's position within an ordered list describing the resources. The processing circuit 604 may optionally in some embodiments randomly select an access request preamble corresponding to a second available resource of the second contention-based uplink channel. The TX circuit 602 may then transmit selected preamble, and the RX circuit 603 may receive a positive acknowledgement. Whether or not performed responsive to the transmitted selected preamble, the processing circuit 604 may derive system information for a second available resource of the second contention-based uplink channel based on, e.g. as a function of, the first available resource. Finally, TX circuit 602 may in various embodiments conclude with transmitting uplink data on the second contention-based uplink channel using the second available resource.

Thus, embodiments of the mobile terminal 10 for requesting access to a wireless communication system are shown in FIG. 6. The mobile terminal 10 comprises the receiver circuit 603 configured to receive broadcasted system information directly indicating first access request preambles for the first contention based channel, and indirectly indicating second access request preambles for the second contention based channel based on the directly indicated first access request preambles. The mobile terminal 10 further comprises the processing circuit 604 configured to derive the second access request preambles from the first access request preambles, and configured to request access using the second access request preambles or the first access request preambles to access the wireless communication system. The processing circuit 604 may in some embodiments be further configured to randomly select one of the access request preambles and to transmit the randomly selected access request preamble.

The first contention based channel may correspond to a random access channel, RACH. The second contention based channel may correspond to a common Enhanced Dedicated Channel, E-DCH. The processing circuit 604 may in some embodiments be configured to derive the second access request preambles as a function of the first access request preambles. The received broadcasted system information may be comprised in a System Information Block type 5, SIB5. The first access request preambles may correspond to Physical Random Access Channel, PRACH, preambles characterized by a signature sequence, a scrambling code, and a sub-channel. In some embodiments the first access request preambles may be indicated in an information element denoted as Physical Random Access Channel, PRACH, info comprised in a PRACH system information list carried in System Information Block type 5, SIB5. In some embodiments the first access request preambles for the first contention based channel may be indicated as available signatures in the information element PRACH info and the second access request preambles for the second contention based channel may be indirectly indicated as a function of the first access request preambles in an information element denoted as available signatures in an information element denoted PRACH preamble control parameters for enhanced uplink. In some embodiments a preamble scrambling code number of the second access request preambles may be a preamble scrambling code of the first access request preambles. In some embodiments a preamble scrambling code number of the second access request preambles may be a function of the preamble scrambling code of the first access request preambles. In some embodiments an available sub-channel number of the second access request preambles may be set to be equal, the inverse or a 'not-function' of an available sub-channel number indicated in the information element denoted PRACH info.

In some embodiments the received broadcasted system information may further indicate the second available resource of the second contention based channel relative to the first available resource of the second contention based channel. In some embodiments the second available resource may be indicated in an ordered list of resources as a function of a position of the first available resource in the ordered list. The ordered list may define common Enhanced-Dedicated Channel, E-DCH, resources, which each E-DCH Resource is defined by a Soffset information element, an Fractional Dedicated Physical Control Channel, F-DPCH, code number information element, and an E-DCH Hybrid Automatic Repeat Request Acknowledgement Indicator Channel, E-HICH, info for common E-DCH information element. The position of the second available resource in the ordered list may be defined by a default value in the Soffset information element. The default value may be a function of the position of the second available resource within the ordered list, a function of a "Soffset" value of a previous first available resource, or a function of the position of the second available resource and an offset value. The offset value may be a Soffset value of the first available resource. In some embodiments the F-DPCH code number information element may be the same for a maximum of ten common E-DCH resources. In some embodiments the E-HICH info for common E-DCH information element may be defined by a channelization code and a signature sequence, and a default value of the signature sequence is a function of the position of the second available resource within the ordered list, a function of a "Signature Sequence" value of a previous first available resource, or a function of the position of the second available resource and the "Signature Sequence" value of a previous first available resource. In some embodiments a channelization code of the second available resource may be equal to a channelization code of the first available resource. In some embodiments the second available resource may be defined by a value in an information element of a scrambling code of an uplink Dedicated Physical Control Channel. The value may be a function of the position of the second available resource within the ordered list of common E-DCH resources, a function of a value in an information element of a scrambling code of an uplink Dedicated Physical Control Channel of a previous first available resource or a function of the position of the second available resource and an "Uplink DPCH code info for Common E-DCH" value in the information element of a scrambling code of an uplink Dedicated Physical Control Channel of the previous first available resource.

Those skilled in the art will also appreciate that the various "circuits" described may refer to a combination of analog and digital circuits, and/or one or more processors configured with software and/or firmware (e.g., stored in memory) that, when executed by the one or more processors, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments herein being defined by the following claims.

Thus, those skilled in the art will appreciate that the foregoing description and the accompanying drawings represent non-limiting examples of the methods and apparatuses taught herein. As such, the present disclosure is not limited by the foregoing description and accompanying drawings.

What is claimed is:

1. A method in a base station for managing access to a first contention based channel and a second contention based channel, the method comprising:
   encoding system information directly indicating first access request preambles for the first contention based channel, and indirectly indicating second access request preambles for the second contention based channel based on the directly indicated first access request preambles; and
   broadcasting the encoded system information to mobile terminals;
   wherein the encoding comprises encoding system information that indicates a second available resource of the second contention based channel relative to a first available resource of the second contention based channel;
   wherein the system information that indicates the second available resource of the second contention based channel relative to the first available resource of the second contention based channel is encoded in an ordered list that defines common Enhanced-Dedicated Channel (E-DCH) resources;
   wherein each E-DCH Resource is defined by a Soffset information element, a Fractional Dedicated Physical Control Channel (F-DPCH) code number information element, and an E-DCH Hybrid Automatic Repeat Request Acknowledgement Indicator Channel (E-HICH) info for common E-DCH information element; and
   wherein the position of the second available resource in the ordered list is defined by a default value in the Soffset information element, wherein the default value is a function of the position of the second available resource within the ordered list, a function of a "Soffset" value of a previous first available resource, or a function of the position of the second available resource and an offset value that is a Soffset value of the first available resource.

2. The method of claim 1, wherein said encoding comprises one of the following:
   encoding the system information so that the second access request preambles are derivable as a function of the first access request preambles;
   encoding the system information to be included in a System Information Block type 5(SIB5);
   encoding the system information to indirectly indicate a preamble scrambling code number of the second access request preambles as a preamble scrambling code of the first access request preambles;
   encoding the system information to indirectly indicate a preamble scrambling code number of the second access request preambles as a function of a preamble scrambling code of the first access request preambles;
   encoding the system information to indirectly indicate an available sub-channel number of the second access request preambles as being equal to, or the inverse of, an available sub-channel number indicated in an information element denoted Physical Random Access Channel (PRACH) info;
   encoding the system information to indicate the first access request preambles in an information element denoted as PRACH info included in a PRACH system information list carried in a SIB5; and
   encoding the system information to indicate the first access request preambles for the first contention based channel as available signatures in the information element PRACH info and to indirectly indicate the second access request preambles for the second contention based channel as a function of the first access request preambles in an information element denoted as available signatures in an information element denoted PRACH preamble control parameters for enhanced uplink.

3. The method of claim 1:
   wherein the E-HICH info for common E-DCH information element is defined by a channelization code and a signature sequence;
   wherein a default value of the signature sequence is a function of the position of the second available resource within the ordered list, a function of a "Signature Sequence" value of a previous first available resource, or a function of the position of the second available resource and the "Signature Sequence" value of a previous first available resource; and
   wherein said encoding comprises encoding the system information to indicate a channelization code of the second available resource as being equal to a channelization code of the first available resource.

4. The method of claim 1, wherein the second available resource is defined by a value in an information element of a scrambling code of an uplink Dedicated Physical Control Channel, wherein that value is a function of the position of the second available resource within the ordered list of common E-DCH resources, a function of a value in an information element of a scrambling code of an uplink Dedicated Physical Control Channel of a previous first available resource, or a function of the position of the second available resource and an "Uplink DPCH code info for Common E-DCH" value in the information element of a scrambling code of an uplink Dedicated Physical Control Channel of the previous first available resource.

5. A method in a mobile terminal for requesting access to a wireless communication system, the method comprising:
   receiving broadcasted system information directly indicating first access request preambles for a first contention based channel, and indirectly indicating second access request preambles for a second contention based channel based on the directly indicated first access request preambles, wherein the received broadcasted system information further indicates a second available resource of the second contention based channel relative to a first available resource of the second contention based channel;
   deriving the second access request preambles from the first access request preambles and the second available resource; and
   requesting access to the wireless communication system using the second access request preambles or the first access request preambles, and the second or the first available resource to access the second contention based channel or the first contention based channel, respectively, of the wireless communication system;
   wherein the second available resource of the second contention based channel relative to the first available resource of the second contention based channel is indicated by the received broadcasted system information in an ordered list that defines common Enhanced-Dedicated Channel (E-DCH) resources;

wherein each E-DCH Resource is defined by a Soffset information element, an Fractional Dedicated Physical Control Channel (F-DPCH) code number information element, and an E-DCH Hybrid Automatic Repeat Request Acknowledgement Indicator Channel (E-HICH) info for common E-DCH information element;

wherein the E-HICH info for common E-DCH information element is defined by a channelization code and a signature sequence; and wherein a default value of the signature sequence is a function of the position of the second available resource within the ordered list, a function of a "Signature Sequence" value of a previous first available resource, or a function of the position of the second available resource and the "Signature Sequence" value of a previous first available resource.

6. The method of claim 5, wherein the second access request preambles are derivable as a function of the first access request preambles.

7. The method of claim 5, wherein the first access request preambles correspond to Physical Random Access Channel (PRACH) preambles comprising a signature sequence, a scrambling code, and a sub-channel, and wherein said deriving comprises:

deriving a preamble scrambling code number of the second access request preambles as a preamble scrambling code of the first access request preambles;

deriving a preamble scrambling code number of the second access request preambles as a function of a preamble scrambling code of the first access request preambles; or deriving an available sub-channel number of the second access request preambles as being equal to, or as being the inverse of, an available sub-channel number indicated in the information element denoted PRACH info.

8. The method of claim 5, wherein said deriving comprises:

deriving a channelization code of the second available resource as being equal to a channelization code of the first available resource; or deriving the second available resource according to a value in an information element of a scrambling code of an uplink Dedicated Physical Control Channel, wherein that value is a function of the position of the second available resource within the ordered list of common E-DCH resources, a function of a value in an information element of a scrambling code of an uplink Dedicated Physical Control Channel of a previous first available resource or a function of the position of the second available resource and an "Uplink DPCH code info for Common E-DCH" value in the information element of a scrambling code of an uplink Dedicated Physical Control Channel of the previous first available resource.

9. A base station for managing access to a first contention based channel and a second contention based channel, the base station comprising:

a processing circuit configured to:
encode system information that directly indicates first access request preambles for the first contention based channel, and indirectly indicates second access request preambles for the second contention based channel based on the directly indicated first access request preambles; and encode system information that indicates a second available resource of the second contention based channel relative to a first available resource of the second contention based channel; and a transmitter circuit configured to broadcast the encoded system information to mobile terminals;

wherein the system information that indicates the second available resource of the second contention based channel relative to the first available resource of the second contention based channel is encoded in an ordered list that defines common Enhanced-Dedicated Channel (E-DCH) resources;

wherein each E-DCH Resource is defined by a Soffset information element, a Fractional Dedicated Physical Control Channel (F-DPCH) code number information element, and an E-DCH Hybrid Automatic Repeat Request Acknowledgement Indicator Channel (E-HICH) info for common E-DCH information element; and wherein the position of the second available resource in the ordered list is defined by a default value in the Soffset information element, wherein the default value is a function of the position of the second available resource within the ordered list, a function of a "Soffset" value of a previous first available resource, or a function of the position of the second available resource and an offset value, which offset value is a Soffset value of the first available resource.

10. The base station of claim 9, wherein the processing circuit is configured to perform one of the following:

encode the system information so that the second access request preambles are derivable as a function of the first access request preambles;

encode the system information to be included in a System Information Block type 5(SIB5);

encode the system information to indicate a preamble scrambling code number of the second access request preambles as a preamble scrambling code of the first access request preambles;

encode the system information to indicate a preamble scrambling code number of the second access request preambles as a function of the preamble scrambling code of the first access request preambles;

encode the system information to indicate the first access request preambles in an information element denoted as Physical Random Access Channel (PRACH) info included in a PRACH system information list carried in SIB5;

encode the system information to indicate the first access request preambles for the first contention based channel as available signatures in the information element PRACH info and to indirectly indicate the second access request preambles for the second contention based channel as a function of the first access request preambles in an information element denoted as available signatures in an information element denoted PRACH preamble control parameters for enhanced uplink; and set an available sub-channel number of the second access request preambles to be equal to, or to be the inverse of, an available sub-channel number indicated in the information element denoted PRACH info.

11. The base station of claim 9:
wherein the E-HICH info for common E-DCH information element is defined by a channelization code and a signature sequence;

wherein a default value of the signature sequence is a function of the position of the second available resource within the ordered list, a function of a "Signature Sequence" value of a previous first available resource, or a function of the position of the second available resource and the "Signature Sequence" value of a previous first available resource; and wherein the processing circuit is configured to encode the system information to indicate a channelization code of the second available resource as being equal to a channelization code of the first available resource.

12. The base station of claim 9, wherein the second available resource is defined by a value in an information element of a scrambling code of an uplink Dedicated Physical Control Channel, wherein that value is a function of the position of the second available resource within the ordered list of common E-DCH resources, a function of a value in an information element of a scrambling code of an uplink Dedicated Physical Control Channel of a previous first available resource or a function of the position of the second available resource and an "Uplink DPCH code info for Common E-DCH" value in the information element of a scrambling code of an uplink Dedicated Physical Control Channel of the previous first available resource.

13. A mobile terminal for requesting access to a wireless communication system, the mobile terminal comprising:
a receiver circuit configured to receive broadcasted system information directly indicating first access request preambles for a first contention based channel, and indirectly indicating second access request preambles for a second contention based channel based on the directly indicated first access request preambles, wherein the received broadcasted system information further indicates a second available resource of the second contention based channel relative to a first available resource of the second contention based channel; and
a processing circuit configured to:
derive the second access request preambles from the first access request preambles and the second available resource; and
request access to the wireless communication system using the second access request preambles or the first access request preambles, and the second or the first available resource to access the second contention based channel or the first contention based channel, respectively, of the wireless communication system;
wherein the second available resource of the second contention based channel relative to the first available resource of the second contention based channel is indicated by the received broadcasted system information in an ordered list that defines common Enhanced-Dedicated Channel (E-DCH) resources;
wherein each E-DCH Resource is defined by a Soffset information element, an Fractional Dedicated Physical Control Channel (F-DPCH) code number information element, and an E-DCH Hybrid Automatic Repeat Request Acknowledgement Indicator Channel (E-HICH) info for common E-DCH information element;
wherein the E-HICH info for common E-DCH information element is defined by a channelization code and a signature sequence; and
wherein a default value of the signature sequence is a function of the position of the second available resource within the ordered list, a function of a "Signature Sequence" value of a previous first available resource, or a function of the position of the second available resource and the "Signature Sequence" value of a previous first available resource.

14. The mobile terminal of claim 13, wherein the processing circuit is configured to derive the second access request preambles as a function of the first access request preambles.

15. The mobile terminal of claim 13, wherein the first access request preambles correspond to Physical Random Access Channel (PRACH) preambles comprising a signature sequence, a scrambling code, and a sub-channel, and wherein the processing circuit is configured to:
derive a preamble scrambling code number of the second access request preambles as a preamble scrambling code of the first access request preambles;
derive a preamble scrambling code number of the second access request preambles as a function of the preamble scrambling code of the first access request preambles; or
derive an available sub-channel number of the second access request preambles as being equal to, or as being the inverse of, an available sub-channel number indicated in the information element denoted PRACH info.

16. The mobile terminal of claim 13, wherein the processing circuit is configured to:
derive a channelization code of the second available resource as being equal to a channelization code of the first available resource; or
derive the second available resource according to a value in an information element of a scrambling code of an uplink Dedicated Physical Control Channel, wherein that value is a function of the position of the second available resource within the ordered list of common E-DCH resources, a function of a value in an information element of a scrambling code of an uplink Dedicated Physical Control Channel of a previous first available resource or a function of the position of the second available resource and an "Uplink DPCH code info for Common E-DCH" value in the information element of a scrambling code of an uplink Dedicated Physical Control Channel of the previous first available resource.

* * * * *